United States Patent
Koshimae

(10) Patent No.: US 12,479,597 B2
(45) Date of Patent: Nov. 25, 2025

(54) MOVABLE OBJECT, NOTIFICATION METHOD, AND NOTIFICATION SYSTEM

(71) Applicant: Sony Group Corporation, Tokyo (JP)

(72) Inventor: Hidenari Koshimae, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 178 days.

(21) Appl. No.: 18/566,120

(22) PCT Filed: Feb. 21, 2022

(86) PCT No.: PCT/JP2022/006871
§ 371 (c)(1),
(2) Date: Dec. 1, 2023

(87) PCT Pub. No.: WO2022/259631
PCT Pub. Date: Dec. 15, 2022

(65) Prior Publication Data
US 2024/0367815 A1    Nov. 7, 2024

(30) Foreign Application Priority Data

Jun. 9, 2021 (JP) .................... 2021-096678

(51) Int. Cl.
*B64D 47/02* (2006.01)
*B64D 47/08* (2006.01)
(Continued)

(52) U.S. Cl.
CPC ............. *B64D 47/02* (2013.01); *B64D 47/08* (2013.01); *B64U 10/13* (2023.01); *G05D 1/2232* (2024.01);
(Continued)

(58) Field of Classification Search
CPC ........ B64D 47/02; B64D 47/08; B64U 10/13; B64U 2201/20; G05D 1/2232; G05D 2109/254
See application file for complete search history.

(56) References Cited

U.S. PATENT DOCUMENTS 10,386,842 B2    8/2019  Schick
2017/0259183 A1* 9/2017  Matloff .................. A63H 27/12

FOREIGN PATENT DOCUMENTS

JP    2016-143954 A    8/2016
JP    2016-225953 A    12/2016
(Continued)

OTHER PUBLICATIONS

International Search Report and Written Opinion mailed on Apr. 5, 2022, received for PCT Application PCT/JP2022/006871, filed on Feb. 21, 2022, 08 pages including English Translation.

*Primary Examiner* — Michael D Lang
(74) *Attorney, Agent, or Firm* — XSENSUS LLP

(57) ABSTRACT

A movable object according to an embodiment of the present technology includes a body unit, a notification unit, and a notification control unit. The notification unit is provided in the body unit. The notification control unit controls an operation of the notification unit, to thereby notify of information regarding at least one of an orientation of the body unit or a position on the body unit as assistance information for assisting work of a user on the movable object. This enables the user to intuitively recognize which orientation the user should put the body unit in, and the workability in user's work can be improved.

20 Claims, 7 Drawing Sheets

(51) Int. Cl.
  *B64U 10/13* (2023.01)
  *G05D 1/223* (2024.01)
  *G05D 109/25* (2024.01)
(52) U.S. Cl.
  CPC ... *B64U 2201/20* (2023.01); *G05D 2109/254* (2024.01)

(56) References Cited

FOREIGN PATENT DOCUMENTS

| | | | |
|---|---|---|---|
| JP | 6768746 | B2 | 10/2020 |
| JP | 6840333 | B2 | 3/2021 |
| WO | 03/062127 | A1 | 7/2003 |
| WO | WO-2017143588 | A1 | 8/2017 |

\* cited by examiner

A

B

A

B

A

B

MOVABLE OBJECT, NOTIFICATION METHOD, AND NOTIFICATION SYSTEM

CROSS-REFERENCE TO RELATED APPLICATIONS

The present application is based on PCT filing PCT/JP2022/006871, filed Feb. 21, 2022, which claims priority from Japanese Patent Application No. 2021-096678, filed Jun. 9, 2021, the entire contents of each are incorporated herein by reference.

TECHNICAL FIELD

The present technology relates to a movable object, a notification method for information regarding the movable object, and a notification system.

BACKGROUND ART

In a calibration apparatus for a camera described in Patent Literature 1, work contents for calibration are displayed on a screen and presented to a user. This allows simplification of the calibration work (e.g., specification paragraphs [0049] and [0050], FIG. 7).

CITATION LIST

Patent Literature

Patent Literature 1: Japanese Patent Application Laid-open No. 2016-225953

DISCLOSURE OF INVENTION

Technical Problem

It is desirable to provide a technology that allows improvement of the workability in the above-mentioned calibration work, for example.

In view of the above-mentioned circumstances, it is an objective of the present technology to provide a movable object, a notification method, and a notification system that allow improvement in the workability in user's work.

Solution to Problem

In order to accomplish the above-mentioned objective, a movable object according to an embodiment of the present technology includes a body unit, a notification unit, and a notification control unit.

The notification unit is provided in the body unit.

The notification control unit controls an operation of the notification unit, to thereby notify of information regarding at least one of an orientation of the body unit or a position on the body unit as assistance information for assisting work of a user on the movable object.

In this movable object, the user is notified of the information regarding the at least one of the orientation of the body unit or the position on the body unit as the assistance information for assisting the work of the user on the movable object by controlling the operation of the notification unit provided in the body unit. This allows improvement in the workability of the work of the user on the movable object.

The notification control unit may control an operation of the notification unit, to thereby notify of information regarding progress of the work of the user on the movable object as the assistance information.

The notification control unit may notify of at least one of information indicating that the work of the user on the movable object has been completed or information indicating that the work of the user on the movable object has failed as the assistance information.

In a case where the work of the user on the movable object includes a plurality of steps, the notification control unit may notify of at least one of information indicating that the step has been completed or information indicating that the step has failed with respect to each of the plurality of steps as the assistance information.

The movable object may further include a sensor unit. In this case, the assistance information may include information for assisting calibration work on the sensor unit.

The sensor unit may include at least one of an inertial sensor, a geomagnetic sensor, or an image sensor.

The movable object may further include a predetermined functional component provided in the body unit. In this case, the notification control unit may notify of information indicating a direction of moving the functional component as the assistance information for assisting work of moving the functional component.

The body unit may have a front surface portion, a left side surface portion, a rear surface portion, and a right side surface portion. In this case, the notification unit may have a front surface portion-side light source provided in the front surface portion, a left side surface portion-side light source provided in the left side surface portion, a rear surface portion-side light source provided in the rear surface portion, and a right side surface portion-side light source provided in the right side surface portion. Moreover, the notification control unit may control light-up of each of the front surface portion-side light source, the left side surface portion-side light source, the rear surface portion-side light source, and the right side surface portion-side light source, to thereby notify of a portion that is on a side opposite to ground out of the front surface portion, the left side surface portion, the rear surface portion, and the right side surface portion with respect to work of placing the body unit on the ground.

The body unit may have an upper surface portion and a lower surface portion. In this case, the notification unit may have an upper surface portion-side light source provided in the upper surface portion and a lower surface portion-side light source provided in the lower surface portion. Moreover, the notification control unit may control light-up of each of the upper surface portion-side light source and the lower surface portion-side light source, to thereby notify of a portion that is on a side opposite to ground out of the upper surface portion and the lower surface portion with respect to work of placing the body unit on the ground.

The front surface portion-side light source may have a first light source provided at a boundary between the front surface portion and the left side surface portion and a second light source provided at a boundary between the front surface portion and the right side surface portion. In this case, the left side surface portion-side light source may have the first light source and a third light source provided at a boundary between the left side surface portion and the rear surface portion. Moreover, the rear surface portion-side light source may have the third light source and a fourth light source provided at a boundary between the rear surface portion and the right side surface portion. Moreover, the right side surface portion-side light source may have the second light source and the fourth light source. Moreover, the notification control unit may control light-up of each of the first light source, the second light source, the third light source, and the fourth light source, to thereby notify of a portion that is on a side opposite to ground out of the front surface portion, the left side surface portion, the rear surface portion, and the right side surface portion with respect to work of placing the body unit on the ground.

Each of the first light source, the second light source, the third light source, and the fourth light source may be provided at a position included in the upper surface portion and function as the upper surface portion-side light source. In this case, the notification control unit may control light-up of each of the first light source, the second light source, the third light source, and the fourth light source, to thereby notify of a portion that is on a side opposite to ground out of the upper surface portion and the lower surface portion with respect to work of placing the body unit on the ground.

The body unit may have a front surface portion, a left side surface portion, a rear surface portion, and a right side surface portion. In this case, the notification unit may have a front surface portion-side light source provided in the front surface portion, a left side surface portion-side light source provided in the left side surface portion, a rear surface portion-side light source provided in the rear surface portion, and a right side surface portion-side light source provided in the right side surface portion. Moreover, the notification control unit may control light-up of each of the front surface portion-side light source, the left side surface portion-side light source, the rear surface portion-side light source, and the right side surface portion-side light source, to thereby notify an orientation of the body unit retained by the user with respect to work of retaining the body unit and performing a predetermined motion.

The notification control unit may control light-up of each of the front surface portion-side light source, the left side surface portion-side light source, the rear surface portion-side light source, and the right side surface portion-side light source, to thereby notify of a portion that is on a side oriented toward the user out of the front surface portion, the left side surface portion, the rear surface portion, and the right side surface portion or notify of a portion that is on a side opposite to ground out of the front surface portion, the left side surface portion, the rear surface portion, and the right side surface portion.

The movable object may further include a plurality of propellers. In this case, the body unit includes a plurality of retaining units that retains the plurality of propellers. Moreover, the notification unit includes a light source provided in each of the plurality of retaining units. Moreover, the notification control unit controls light-up of the light source provided in each of the plurality of retaining units, to thereby notify of a position of the propeller that is a replacement work target.

The notification unit may include at least one of a light source device, a sound output device, or a display device, and the notification control unit may control at least one of light-up of the light source device, sound output of the sound output device, or image display of the display device, to thereby notify of the assistance information.

The light source device may include a plurality of light-emitting diodes. In this case, the notification control unit may control a light-up pattern of the plurality of light-emitting diodes, to thereby notify of the assistance information.

The movable object may further include: a propeller provided in the body unit; and a motor that rotates the propeller. In this case, the motor may function as the sound output device by rotating and outputting a sound in a state in which the propeller is detached.

The above-mentioned movable object may be configured as a drone.

A notification method according to an embodiment of the present technology includes controlling an operation of a notification unit provided in a body unit of a movable object, to thereby notify of information regarding at least one of an orientation of the body unit or a position on the body unit as assistance information for assisting work of a user on the movable object.

A notification system according to an embodiment of the present technology includes a reception unit and a notification control unit.

The reception unit receives from a user an instruction to perform work of the user on a movable object.

The notification control unit controls, in a case where the instruction to perform the work of the user on the movable object has been received, an operation of a notification unit provided in the body unit of the movable object, to thereby notify of information regarding at least one of an orientation of the body unit or a position on the body unit as assistance information for assisting work of a user on the movable object.

MODE(S) FOR CARRYING OUT THE INVENTION

Hereinafter, embodiments according to the present technology will be described with reference to the drawings.
[Drone Flight Control System]

Figure 1:
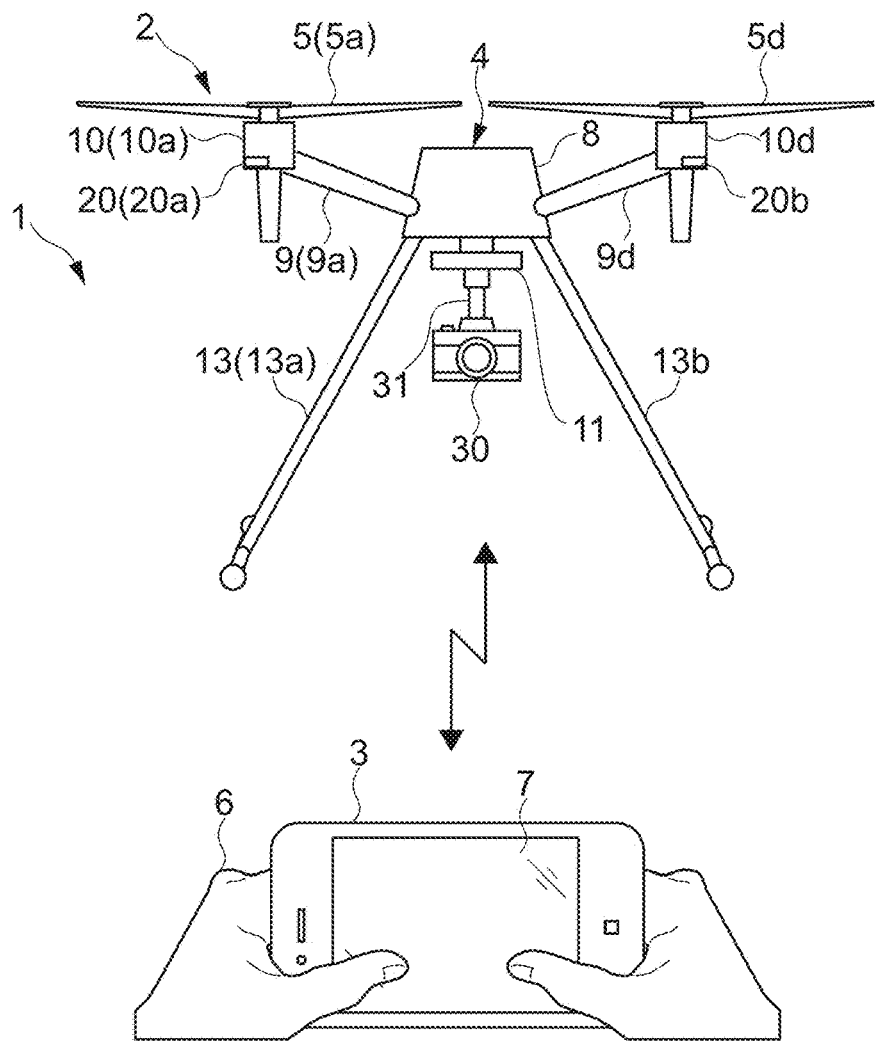
FIG. 1 A schematic view showing a configuration example of a drone flight control system according to an embodiment of the present technology.

FIG. 1 is a schematic view showing a configuration example of a drone flight control system according to an embodiment of the present technology.

A drone flight control system 1 shown in FIG. 1 is a system to which a notification system according to the present technology is applied. Moreover, the drone flight control system 1 also corresponds to an embodiment of a movable object control system according to the present technology.

The drone flight control system 1 includes a drone 2 and a control device 3.

The drone 2 and the control device 3 are connected to be capable of communicating with each other. A communication configuration for connecting both devices to be capable of communicating with each other is not limited and any communication technology may be used. For example, wireless network communication such as WiFi or near-field communication such as Bluetooth (registered trademark) can be used.

As shown in FIG. 1, the drone 2 has propellers 5 attached to a body unit 4. The drone 2 is capable of flying by rotating the propellers 5.

The control device 3 is capable of controlling various operations including the flight of the drone 2 and the like in accordance with an operation (instruction) input from a user 6.

The drone 2 corresponds to an embodiment of a movable object according to the present technology.

In the present embodiment, a smartphone or a tablet device is used as the control device 3. That smartphone or the like installs an application (application program) for controlling the operation of the drone 2.

The user 6 starts the application for controlling the operation of the drone 2. Then, the operation of the drone 2 can be controlled by inputting a touch operation, for example, to a variety of graphical user interfaces (GUIs) displayed on a touch panel 7.

The application for controlling the operation of the drone 2 can also be said to be an embodiment of a program according to the present technology.

Specific configurations of the GUIs displayed for controlling the operation of the drone 2 are not limited, and may be arbitrarily set.

It should be noted that a manipulator or a transmitter (proportional system), for example, may be used as the control device 3.

Figure 2:
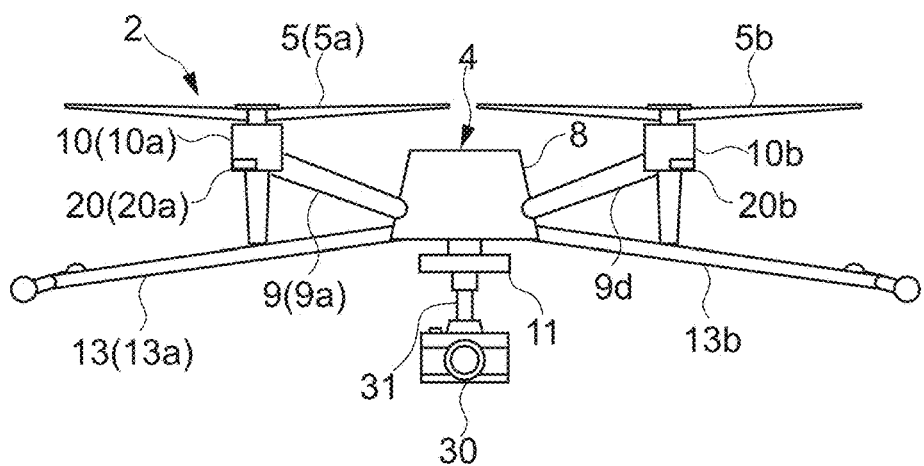
FIG. 2 A schematic view showing a flying drone.

FIG. 2 is a schematic view showing the flying drone 2.

As shown in FIGS. 1 and 2, the body unit 4 of the drone 2 has two leg portions 13. The two leg portions 13 are held in contact with the ground and support the entire body unit 4 when the drone 2 is placed on the ground.

The state shown in FIG. 1 is a state (hereinafter, referred to as a basic placement state) in which the drone 2 is placed on the ground and the two leg portions 13 support the entire body unit 4 of the drone 2.

As shown in FIG. 2, in a case where the drone 2 flies, tip ends (portions grounded in the basic placement state) of the two leg portions 13 are lifted upward (to a side opposite to the ground) (hereinafter, referred to as a flying state) so that the distance between the tip ends increases.

For example, at the start of the flight of the drone 2, rotation of the propellers 5 lifts upwards the entire body unit 4, keeping the basic placement state shown in FIG. 1. In that state, the tip ends of the two leg portions 13 are lift upwards, and the drone 2 shifts to the flying state shown in FIG. 2. Then, in the flying state, the drone 2 flies in accordance with, for example, a flight instruction from the control device 3.

As a matter of course, the attitude during the flight of the drone 2 and the operation at the flight start are not limited, and any attitude and operation may be employed.

Figure 3:
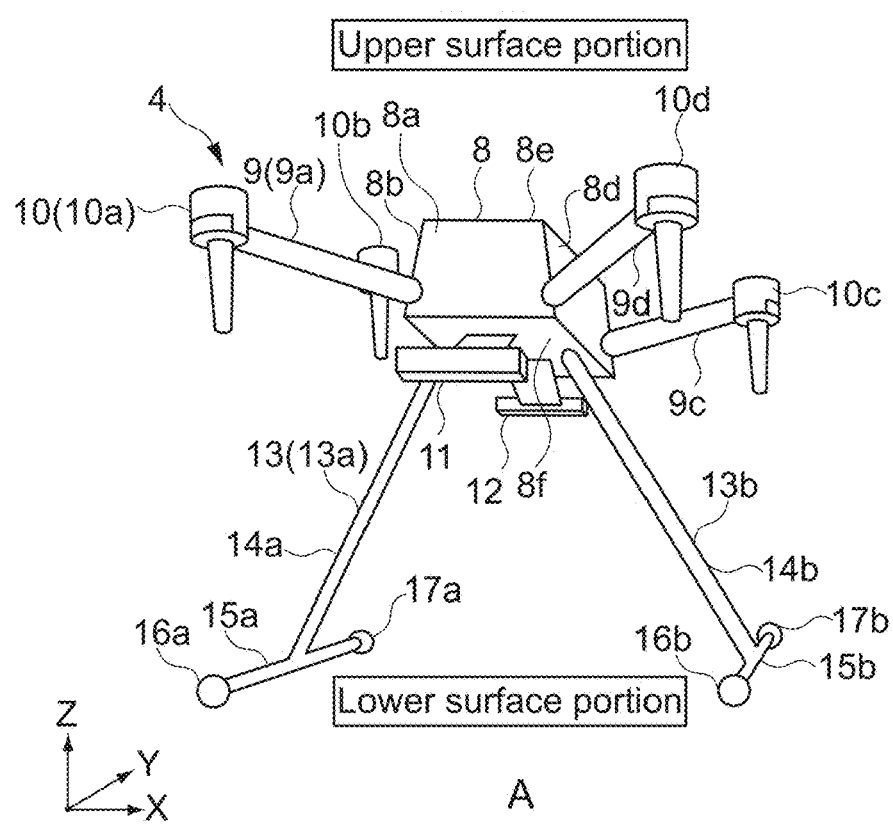
FIG. 3 A schematic view mainly showing a body unit of the drone.
Figure 3:
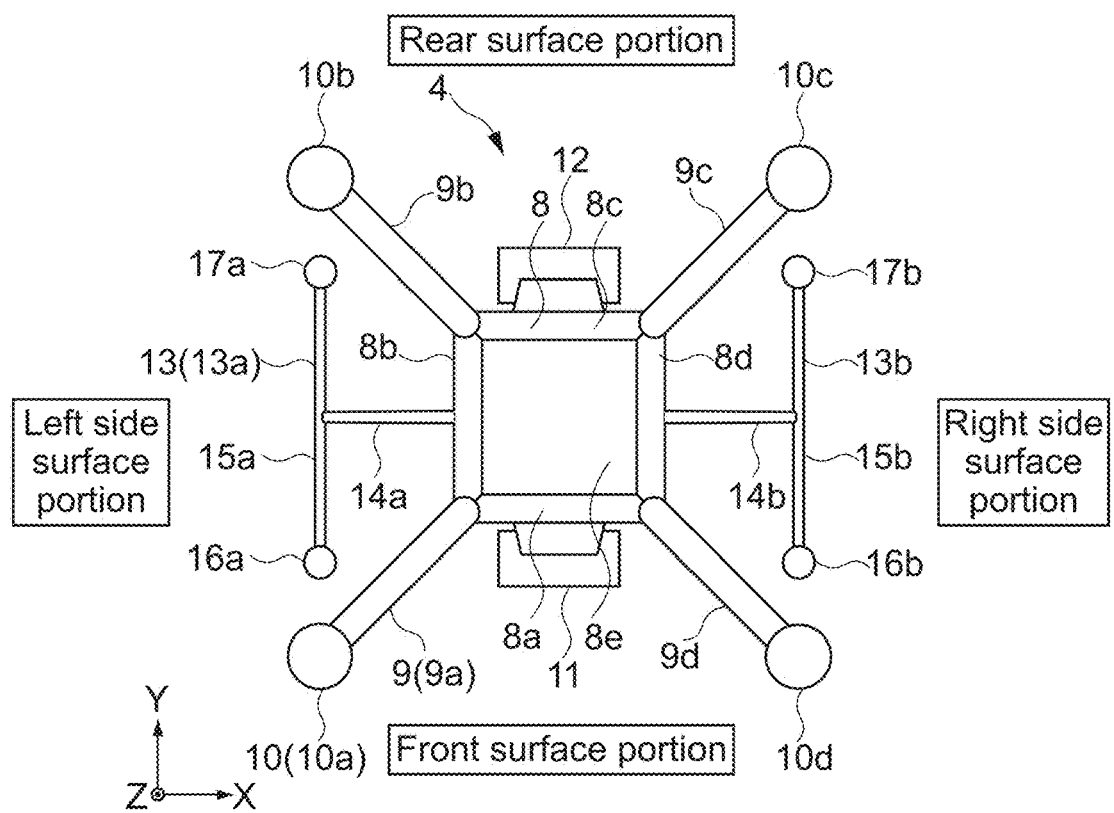

FIG. 3 is a schematic view mainly showing the body unit 4 of the drone 2.

FIG. 3 shows the body unit 4 in the basic placement state in which the drone 2 is placed on the ground.

FIG. 3A is a perspective view showing a front surface side of the body unit 4.

FIG. 3B is a top view of the body unit 4 as viewed from an upper side (side opposite to the ground).

The front surface side of the body unit 4 typically means a travelling direction when the drone 2 moves.

Hereinafter, left- and right-hand directions as the body unit 4 is viewed from the front surface side are defined as an X direction (the arrow orientation in the X direction is a right-hand side and the opposite side is the left-hand side). Moreover, a depth direction as the body unit 4 is viewed from the front surface side is defined as a Y direction (the arrow orientation in the Y direction is a deep side (back side) and the opposite side is a front side). Moreover, upper and lower directions are defined as a Z direction (the arrow orientation in the Z direction is an upper side and the opposite side is a lower side).

As shown in FIG. 3, the body unit 4 includes a main body portion 8, four arm portions 9a to 9d, four rotor portions 10a to 10d, a front side retaining portion 11, a rear side retaining portion 12, and two leg portions 13a and 13b.

As shown in FIG. 3B, the main body portion 8 has a substantially rectangular parallelepiped shape as a whole. The main body portion 8 includes a front surface portion 8a oriented forwards, a left side surface portion 8b oriented leftwards, a rear surface portion 8c oriented rearwards, and a right side surface portion 8d oriented rightwards. Moreover, the main body portion 8 includes an upper surface portion 8e oriented upwards and a lower surface portion 8f oriented downwards. As shown in FIG. 3B, the main body portion 8 is arranged at the center position of the body unit 4 as the body unit 4 is viewed from above. In other words, the body unit 4 is configured so that the main body portion 8 is at the center position as the body unit 4 is viewed from above.

As a matter of course, the present technology is not limited to such a configuration.

As shown in FIG. 3B, the four arm portions 9a to 9d are configured to radially extend to be symmetric with respect to the main body portion 8 as the body unit 4 is viewed from above. The four arm portions 9a to 9d are configured to respectively extend from four corner positions of the main body portion 8 as the body unit 4 is viewed from above.

The arm portion 9a is configured to extend to the left front side from a boundary between the front surface portion 8a and the left side surface portion 8b of the main body portion 8.

The arm portion 9b is configured to extend to the left rear side from a boundary between the left side surface portion 8b and the rear surface portion 8c of the main body portion 8.

The arm portion 9c is configured to extend to the right rear side from a boundary between the rear surface portion 8c and the right side surface portion 8d of the main body portion 8.

The arm portion 9d is configured to extend to the right front side from a boundary between the right side surface portion 8d and the front surface portion 8a of the main body portion 8.

Moreover, as also shown in FIG. 1 and the like, each of the four arm portions 9a to 9b is connected to the main body portion 8 to extend upwards.

The four arm portions 9a to 9d have the same configuration and also have the same length.

The four rotor portions 10a to 10d are configured to be the tip ends of the four arm portions 9a to 9d, respectively.

The respective rotor portions 10 (10a to 10d) have motors 19 (see FIG. 4) connected to the propellers 5 (5a to 5d). Driving the motors 19 causes the propellers 5 to rotate and generate upward lift.

In the present embodiment, as the body unit 4 is viewed from above, the four propellers 5a to 5d are arranged at positions symmetric with respect to the main body portion 8. The rotation of the four propellers 5a to 5d allows a stable flight and can achieve high-accuracy flight control.

Specific configuration of the rotor portions 10 (e.g., specific configurations of the motors 19 and a configuration of a mechanism for connecting to the propellers 5) are not limited, and may be arbitrarily designed.

The front side retaining portion 11 is connected to a front portion of the lower surface portion 8*f* of the main body portion 8. The front side retaining portion 11 is configured to protrude forwards and downwards from the main body portion 8.

The rear side retaining portion 12 is connected to a rear portion of the lower surface portion 8*f* of the main body portion 8. The rear side retaining portion 12 is configured to protrude rearwards and downwards from the main body portion 8.

The front side retaining portion 11 and the rear side retaining portion 12 have substantially the same configuration. Moreover, the front side retaining portion 11 and the rear side retaining portion 12 are configured to be symmetric with respect to the main body portion 8.

The two leg portions 13*a* and 13*b* are connected to the lower surface portion 8*f* of the main body portion 8. Each leg portion 13 has a T-shape and includes a connection portion 14*a* (14*b*) and a distal end portion 15*b* (15*b*). The connection portion 14*a* (14*b*) and the distal end portion 15*b* (15*b*) each have a rod-like shape and are orthogonally coupled with each other.

As shown in FIG. 3, the left leg portion 13*a* includes a connection portion 14*a* extending downwards and leftwards from a left side portion of the lower surface portion 8*f* and a distal end portion 15*a* that is, at its center, coupled to the connection portion 14*a*. The distal end portion 15*a* extends in the Y direction and includes a front side end portion 16*a* and a rear side end portion 17*a*.

The right leg portion 13*b* includes a connection portion 14*b* extending downwards and rightwards from a right side portion of the lower surface portion 8*f* and a distal end portion 15*b* that is, at its center, coupled to the connection portion 14*b*. The distal end portion 15*b* extends in the Y direction and includes a front side end portion 16*a* and a rear side end portion 17*b*.

The distal end portion 15*a* of the leg portion 13*a* and the distal end portion 15*b* of the leg portion 13*b* can stably support the entire body unit 4 in such a manner that they are held in contact with the ground.

The body unit 4 corresponds to an embodiment of a body unit according to the present technology.

Figure 4:
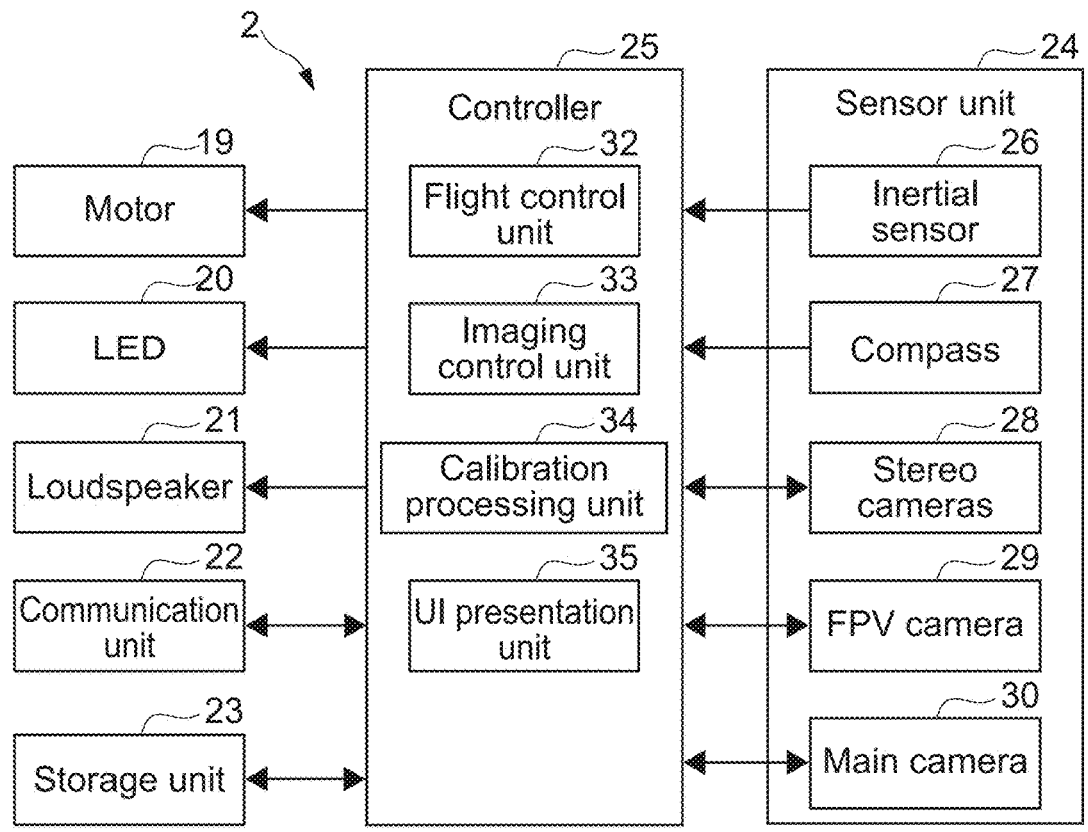
FIG. 4 A block diagram showing functional configuration examples of the drone.

FIG. 4 is a block diagram showing functional configuration examples of the drone 2.

The drone 2 includes the motors 19, light-emitting diodes (LEDs) 20, a loudspeaker 21, a communication unit 22, a storage unit 23, a sensor unit 24, and a controller 25.

The motors 19 are arranged in the four rotor portions 10*a* to 10*d*. The motors 19 are connected to the propellers 5.

As shown in FIGS. 1 to 3, the LEDs 20 are mounted at the outer periphery of the four rotor portions 10*a* to 10*d*. Thus, four LEDs 20*a* to 20*d* are mounted on the body unit 4.

The LED 20*a* is mounted at the outer periphery of the rotor portion 10*a*.

The LED 20*b* is mounted at the outer periphery of the rotor portion 10*b*.

The LED 20*c* is mounted at the outer periphery of the rotor portion 10*c*.

The LED 20*d* is mounted at the outer periphery of the rotor portion 10*d*.

The four LEDs 20*a* to 20*d* are respectively arranged at positions symmetric with respect to the main body portion 8 as the body unit 4 is viewed from above. Each LED 20 is mounted to be capable of emitting light mainly in a direction in which the arm portion 9 extends. Thus, controlling light-up of the four LEDs 20*a* to 20*d* allows light emission to the periphery of the body unit 4 (i.e., the periphery of the drone 2).

Moreover, the respective LEDs 20 are capable of emitting light in multiple colors. The respective LEDS 20 are capable of switching and emitting red, blue, green, and yellow light, for example.

Controlling and combining light-up patterns (e.g., blink), colors, and the like of the respective LEDs 20 can achieve a variety of light emission modes (emission patterns).

The LEDs 20*a* to 20*d* correspond to an embodiment of a notification unit provided in the body unit according to the present technology.

Moreover, the LEDs 20*a* to 20*d* also correspond to a light source device and an embodiment of a plurality of light-emitting diodes according to the present technology.

It should be noted that any other devices may be used as the notification unit and the light source device according to the present technology. For example, a laser diode (LD) or a lamp may be used. As a matter of course, different types of light source devices may be used in combination (e.g., the use of both LD and LED).

The loudspeaker 21 is capable of outputting a variety of sounds and is provided in the main body portion 8 (specific illustration is omitted). A specific configuration of the loudspeaker 21 is not limited.

The loudspeaker 21 corresponds to an embodiment of the notification unit provided in the body unit according to the present technology.

Moreover, the loudspeaker 21 also corresponds to an embodiment of a sound output device according to the present technology.

Any other devices may be used as the notification unit and the sound output device according to the present technology.

In the present embodiment, rotation of the motors 19 in a state in which the propellers 5 are detached can output a predetermined sound (e.g., a notification sound or an error sound). That is, in the present embodiment, the motors 19 in the state in which the propellers 5 are detached functions as an embodiment of the sound output device.

As a matter of course, rotation of the motors 19 in the state in which the propellers 5 are connected may output a predetermined sound. On the other hand, a configuration capable of outputting a predetermined sound in a state in which the propellers 5 are detached can improve the safety when outputting the sound.

In a case of employing such a configuration, it is desirable to employ the devices (e.g., the LEDs 20) other than the motors 19 as an embodiment of the notification unit according to the present technology. As a matter of course, it is also possible to employ a configuration using only the motors 19 as the sound output device without the loudspeaker 21.

The communication unit 22 is a module for network communication, near-field communication, or the like with other device. For example, a wireless LAN module such as WiFi or a communication module such as Bluetooth (registered trademark) can be provided.

In the present embodiment, the communication with the control device 3 is performed via the communication unit 22.

The storage unit 23 is a storage device such as a non-volatile memory and may be, for example, a hard disk drive (HDD) or a solid state drive (SSD). Alternatively, any computer-readable non-transitory storage medium may be used as the storage unit 23.

The storage unit 23 stores a control program for comprehensively controlling the operation of the drone 2. In addition, the storage unit 23 stores a variety of data such as data necessary for the flight, e.g., map data.

The sensor unit 24 includes an inertial sensor 26, a compass 27, stereo cameras 28, a first person view (FPV) camera 29, and a main camera 30.

In the present disclosure, the sensor also includes a camera (image pickup device).

The inertial sensor 26 is a sensor capable of measuring inertial force. The inertial sensor 26 is mounted on the main body portion 8 of the body unit 4 (specific illustration is omitted).

In the present embodiment, the inertial sensor 26 includes at least one of an accelerometer or a gyroscope. In the present embodiment, an inertial measurement unit (IMU) sensor is used as the inertial sensor 26. The IMU sensor is also called inertial measurement unit.

The IMU sensor is capable of detecting acceleration and angular velocity of the drone 2 with respect to three axes orthogonal to one another, for example.

As a matter of course, only the accelerometer or the gyroscope may be used as the inertial sensor 26.

Moreover, any configuration may be employed as a specific configuration of the inertial sensor 26.

The compass 27 is used for detecting a direction in which the drone 2 is oriented. The compass 27 is mounted on the main body portion 8 of the body unit 4 (specific illustration is omitted).

A specific configuration of the compass 27 is not limited, and any configuration such as a 3-axis electronic compass may be employed.

The stereo cameras 28 are used as distance sensors. In the present embodiment, the four stereo cameras 28 for the front side, for the left-hand side, for the rear side, and for the right-hand side are used as the distance sensors.

The stereo camera 28 for the front side is provided in the front side retaining portion 11 of the body unit 4 (specific illustration is omitted).

The stereo camera 28 for the rear side is provided in the rear side retaining portion 12 (specific illustration is omitted).

The stereo camera 28 for the left-hand side is provided in the left side surface portion 8b of the main body portion 8 (specific illustration is omitted).

The stereo camera 28 for the rear side is provided in the rear side retaining portion 12 (specific illustration is omitted).

The stereo camera 28 for the right-hand side is provided in the right side surface portion 8d of the main body portion 8 (specific illustration is omitted). Specific configurations of the stereo cameras 28 are not limited. Moreover, other distance sensors such as a time of flight (ToF) camera may be used as the stereo cameras 28.

The FPV camera 29 images a front area where the drone 2 travels. The FVP camera 29 is provided in the front side retaining portion 11 of the body unit 4 (specific illustration is omitted).

A specific configuration of the FPV camera 29 is not limited.

The main camera 30 is mounted on the lower surface portion 8e of the main body portion 8 via a 3-axis gimbal 31 as illustrated in FIG. 1.

Controlling the operation of the 3-axis gimbal 31 can achieve imaging in various imaging directions different from the travelling direction of the drone 2.

The main camera 30 and the 3-axis gimbal 31 are removably attached to the main body portion 8 of the drone 2. The user 6 can attach desired cameras and 3-axis gimbal to the main body portion 8 and use them as the main camera 30.

Specific configuration of the main camera 30 and the 3-axis gimbal 31 are not limited.

The type of sensor provided as the sensor unit 24 is not limited, and any sensor may be provided.

For example, a GPS sensor that acquires information about the current location of the drone 2 may be mounted. Alternatively, a temperature sensor or a humidity sensor, for example, may be mounted.

In the present embodiment, the sensor unit 24 corresponds to an embodiment of a sensor unit according to the present technology.

The inertial sensor 26 and the compass 27 correspond to embodiments of an inertial sensor and a geomagnetic sensor according to the present technology.

The stereo cameras 28, the FVP camera 29, and the main camera 30 correspond to an embodiment of an image sensor (image pickup device) according to the present technology.

The controller 25 controls the operations of the respective parts of the drone 2. The controller 25 has hardware required for a computer, such as a CPU and memories (RAM, ROM). Various types of processing are executed by the CPU executing the program according to the present technology stored in the storage unit 23 or memory.

For example, a programmable logic device (PLD) such as a field programmable gate array (FPGA) and another device such as an application specific integrated circuit (ASIC) may be used as the controller 25.

In the present embodiment, a flight control unit 32, an imaging control unit 33, a calibration processing unit 34, and a UI presentation unit 35 are achieved as functional blocks by the CPU of the controller 25 executing the program according to the present technology.

Then, these functional blocks execute the information processing method (notification method) according to the present embodiment. It should be noted that dedicated hardware such as an integrated circuit (IC) may be used as appropriate in order to achieve the respective functional blocks.

The flight control unit 32 executes various types of processing related to the flight of the drone 2. For example, the flight control unit 32 controls the motors 19 and the like in accordance with an instruction input to the control device 3 so as to control the travelling direction, the altitude, the speed, and the like of the drone 2. Alternatively, the flight control unit 32 may perform automated flight. The flight control unit 32 may control the flight of the drone 2 on the basis of, for example, a detection result (sensing result) from the sensor unit 24.

An algorithm for controlling the flight of the drone 2 is not limited, and any algorithm may be used. Any machine learning algorithm using a deep neural network (DNN), for example, may be used. For example, the use of artificial intelligence (AI) that performs deep learning can improve the accuracy of flight control.

It should be noted that the machine learning algorithm may be applied to any processing in the present disclosure.

The imaging control unit 33 controls imaging of the four stereo cameras 28, the FVP camera 29, and the main camera 30. The imaging control unit 33 may control imaging of each camera in accordance with an instruction input to the control device 3, for example. As a matter of course, the imaging control unit 33 may execute automatic imaging.

For example, the imaging control unit 33 may control the 3-axis gimbal 31 so as to control the imaging direction and the angle of view of the main camera 30. The imaging control unit 33 may control any other imaging parameters.

An algorithm for controlling imaging of each camera is not limited, and any algorithm may be used.

The calibration processing unit 34 executes calibration processing on the sensor unit 24.

In the present embodiment, the calibration processing unit 34 is capable of calibrating the inertial sensor 26, the compass 27, and the respective cameras.

The UI presentation unit 35 controls the operations of the notification unit (the motors 19, the LEDs 20, the loudspeaker 21), to thereby notify the user 6 of assistance information.

The assistance information is information for assisting the work of the user 6 on the movable object (drone 2) will be described later in detail.

The UI presentation unit 35 corresponds to an embodiment of a notification control unit according to the present technology.

Figure 5:
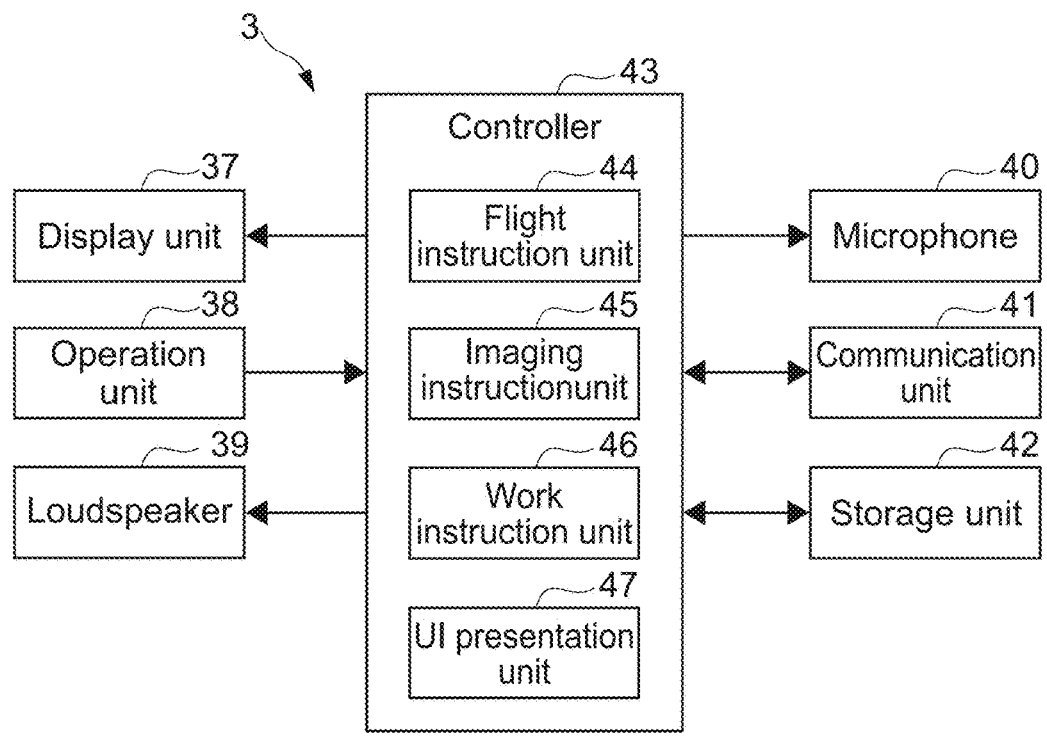
FIG. 5 A block diagram showing functional configuration examples of a control device.

FIG. 5 is a block diagram showing functional configuration examples of the control device 3.

The control device 3 includes a display unit 37, an operation unit 38, a loudspeaker 39, a microphone 40, a communication unit 41, a storage unit 42, and a controller 43.

The display unit 37 is a display device using, for example, liquid-crystal or electro-luminescence (EL) and displays a variety of images and a variety of GUIs, for example. The operation unit 38 is, for example, a keyboard, a pointing device, or other operation apparatuses.

As shown in FIG. 1, in the present embodiment, the touch panel 7 is configured in the control device 3. The touch panel 7 is a device having both functions of the display unit 37 and the operation unit 38 shown in FIG. 5.

The loudspeaker 39 is capable of outputting a variety of sounds. The loudspeaker 39 outputs a variety of sounds such as audio guide, notification sound, and error sound related to the control on the drone 2.

The microphone 40 acquires a voice of the user 6. In the present embodiment, the microphone 40 allows voice input of the user 6. That is, the user 6 can input a variety of instructions by his or her voice.

The communication unit 41 is a module for network communication, near-field communication, or the like with other device. For example, a wireless LAN module such as WiFi or a communication module such as Bluetooth (registered trademark) is provided.

In the present embodiment, the communication with the drone 2 is performed via the communication unit 41.

The storage unit 42 is a storage device such as a non-volatile memory and may be, for example, a hard disk drive (HDD) or a solid state drive (SSD). Alternatively, any computer-readable non-transitory storage medium may be used as the storage unit 42.

The storage unit 42 stores a control program for comprehensively controlling the operation of the control device 3. Moreover, the storage unit 42 installs the application for controlling the operation of the drone 2 (application program). In addition, the storage unit 42 stores a variety of data such as information about the user 6 and map data.

The controller 43 controls the operations of the respective parts of the control device 3. The controller 43 has hardware required for a computer, such as a CPU and memories (RAM, ROM). Various types of processing are executed by the CPU executing the program according to the present technology stored in the storage unit 42 or memory.

For example, a programmable logic device (PLD) such as a field programmable gate array (FPGA) and another device such as an application specific integrated circuit (ASIC) may be used as the controller 43.

In the present embodiment, a flight instruction unit 44, an imaging instruction unit 45, a work instruction unit 46, and a UI presentation unit 47 are achieved as functional blocks by the CPU of the controller 43 executing the program according to the present technology.

Then, these functional blocks according to the present embodiment execute the information processing method. It should be noted that dedicated hardware such as an integrated circuit (IC) may be used as appropriate in order to achieve the respective functional blocks.

The flight instruction unit 44 sends a variety of instructions related to the flight of the drone 2 to the drone 2 in accordance with the input of an instruction from the user 6 (including, for example, input or voice input via the touch panel 7).

The flight instruction unit 44 sends, for example, an instruction related to a flight plan, such as a destination and a flight path, and an instruction related to a flight operation, such as a travelling direction and a speed.

The imaging instruction unit 45 sends a variety of instructions related to imaging of each camera mounted on the drone 2 to the drone 2 in accordance with the input of the instruction from the user 6.

The imaging instruction unit 45 sends a variety of instructions related to imaging, such as an imaging direction, an angle of view, a focal distance, and an imaging mode of the main camera 30.

The work instruction unit 46 sends a variety of instructions related to the work of the user 6 on the drone 2 to the drone 2. The work instruction unit 46 sends, for example, an instruction to start the work of the user 6.

The work of the user 6 on the drone 2 can be, for example, calibration work on the sensor unit 24.

To perform the calibration work on the inertial sensor 26, the compass 27, and the respective cameras, the user 6 starts the application for controlling the drone 2 and inputs the start of the work.

The work instruction unit 46 sends an instruction to execute calibration processing to the drone 2 and the drone 2 shifts to a mode to execute the calibration processing.

The work of the user 6 on the drone 2 can also be replacement work of a component mounted on the drone 2. The work of the user 6 on the drone 2 includes any other work such as maintenance work and operation check work.

To start the work, the user 6 starts the application and inputs the start of the work. The work instruction unit 46 sends an instruction to execute processing corresponding to the work to the drone 2 and the drone 2 shifts a mode to execute the processing.

The UI presentation unit 47 controls the operations of the touch panel 7 (the display unit 37 and the operation unit 38) and the loudspeaker 39, to thereby notify the user 6 of a variety of information. For example, the above-mentioned assistance information may be displayed on the touch panel 7 of the control device 3 or may be output via the loudspeaker 39.

The control device 3 corresponds to an embodiment of a reception unit that receives from the user an instruction to perform the work of the user on the movable object.

As shown in FIG. 3, a front surface portion, a left side surface portion, a rear surface portion, a right side surface portion, a lower surface portion, and an upper surface portion are defined with respect to the drone 2.

The front surface portion includes a portion of the drone 2, which is oriented forwards. Moreover, a portion considered to be located on the front side as the user 6 views the entire drone 2 is also a portion included in the front surface portion.

For example, a directly facing portion as the drone 2 is viewed from the front side is included in the front surface portion. Moreover, a portion projecting forwards, also including a portion not oriented forwards, is a portion included in the front surface portion.

In the present embodiment, the portion included in the front surface portion is the front surface portion 8*a* of the main body portion 8, portions of the arm portions 9*a* and 9*d*, which are oriented forwards, and the rotor portions 10*a* and 10*d*, the front side retaining portion 11, the front side end portion 16*a* of the leg portion 13*a*, and the front side end portion 16*b* of the leg portion 13*b*, which project forwards, for example.

The left side surface portion includes a portion of the drone 2, which is oriented leftwards. Moreover, a portion considered to be located on the left-hand side as the user 6 views the entire drone 2 is also a portion included in the left side surface portion.

For example, a directly facing portion as the drone 2 is viewed from the left-hand side is included in the left side surface portion. Moreover, a portion projecting leftwards, also including a portion not oriented leftwards, is the portion included in the left side surface portion.

In the present embodiment, the portion included in the left side surface portion is the left side surface portion 8*b* of the main body portion 8, portions of the arm portions 9*a* and 9*b*, which are oriented leftwards, and rotor portions 10*a* and 10*b*, and the connection portion 14*a*, and the distal end portion 15*a* of the leg portion 13*a*, which project leftwards, for example.

The rear surface portion includes a portion of the drone 2, which is oriented rearwards. Moreover, a portion considered to be located on the rear side as the user 6 views the entire drone 2 is also a portion included in the rear surface portion.

For example, a directly facing portion as the drone 2 is viewed from the rear side is included in the rear surface portion. Moreover, a portion projecting rearwards, also including a portion not oriented rearwards, is the portion included in the rear surface portion.

In the present embodiment, the portion included in the rear surface portion is the rear surface portion 8*c* of the main body portion 8, portions of the arm portions 9*b* and 9*c*, which are oriented rearwards, and the rotor portions 10*b* and 10*c*, the rear side retaining portion 12, the rear side end portion 17*a* of the leg portion 13*a*, and the rear side end portion 17*b* of the leg portion 13*b*, which project rearwards, for example.

The right side surface portion includes a portion of the drone 2, which is oriented rightwards. Moreover, a portion considered to be located on the right-hand side as the user 6 views the entire drone 2 is also a portion included in the right side surface portion.

For example, a directly facing portion as the drone 2 is viewed from the right-hand side is included in the right side surface portion. Moreover, a portion projecting rightwards, also including a portion not oriented rightwards, is the portion included in the right side surface portion.

In the present embodiment, the portion included in the right side surface portion is the right side surface portion 8*b* of the main body portion 8, portions of the arm portions 9*c* and *db*, which are oriented rightwards, and the rotor portions 10*c* and 10*d* and the connection portion 14*b* and the distal end portion 15*b* of the leg portion 13*b*, which project rightwards, for example.

The upper surface portion includes a portion of the drone 2, which is oriented upwards. Moreover, a portion considered to be located as the user 6 views the entire drone 2 is also a portion included in the upper surface portion.

For example, a directly facing portion as the drone 2 is viewed from the upper side is included in the upper surface portion. Moreover, a portion projecting to upwards, also including a portion not oriented upwards, is the portion included in the upper surface portion.

In the present embodiment, the portion included in the upper surface portion is the upper surface portion 8*e* of the main body portion 8, portions of the arm portions 9*a* to 9*d*, which are oriented upwards, and the rotor portions 10*a* to 10*d* projecting upwards, for example.

The lower surface portion includes a portion of the drone 2, which is oriented downwards. Moreover, a portion considered to be located on the lower side as the user 6 views the entire drone 2 is also a portion included in the lower surface portion.

For example, a directly facing portion as the drone 2 is viewed from the lower side is included in the lower surface portion. Moreover, a portion projecting downwards, also including a portion not oriented downwards, is the portion included in the lower surface portion.

In the present embodiment, the portion included in the lower surface portion is the lower surface portion 8*f* of the main body portion 8, portions of the arm portions 9*a* to 9*d* and the rotor portions 10*a* to 10*d*, which are oriented downwards, and the distal end portion 15*a* of the leg portion 13*a* and the distal end portion 15*b* of the leg portion 13*b*, which project downwards, for example.

Otherwise, as to the respective portions included in the drone 2 and the components such as the propellers 5, portions oriented forward, leftward, rearward, rightward, upward, and downward and portions recognized to be located on the front side, the left-hand side, the rear side, the right-hand side, the upper side, and the lower side are the portions included in the front surface portion, the left side surface portion, the rear surface portion, the right side surface portion, the upper surface portion, and the lower surface portion.

In the present embodiment, the LED 20*a* mounted on the rotor portion 10*a* functions as an embodiment of a first light source provided at a boundary between the front surface portion and the left side surface portion. Moreover, the LED 20*a* functions as an embodiment of a front surface portion-side light source provided in the front surface portion and also functions an embodiment of a left side surface portion-side light source provided in the left side surface portion.

The LED 20*b* mounted on the rotor portion 10*b* functions as an embodiment of a third light source provided at a boundary between the left side surface portion and the rear surface portion. Moreover, the LED 20*b* functions as an embodiment of a left side surface portion-side light source provided in the left side surface portion and also functions an embodiment of a rear surface portion-side light source provided in the rear surface portion.

The LED 20*c* mounted on the rotor portion 10*c* functions as an embodiment of a fourth light source provided at a boundary between the rear surface portion and the right side surface portion. Moreover, the LED 20*c* functions as an embodiment of a rear surface portion-side light source provided in the rear surface portion and also functions an embodiment of a right side surface portion-side light source provided in the right side surface portion.

The LED 20*d* mounted on the rotor portion 10*d* functions as an embodiment of a second light source provided at a boundary between the front surface portion and the right side surface portion. Moreover, the LED 20*d* functions as an embodiment of a right side surface portion-side light source provided in the right side surface portion and also functions an embodiment of a front surface portion-side light source provided in the front surface portion.

That is, in the present embodiment, the front surface portion-side light source unit includes the LEDs 20*a* and 20*d*. Moreover, the left side surface portion-side light source unit includes LEDs 20*a* and 20*b*. Moreover, the rear surface portion-side light source unit includes the LEDs 20*b* and 20*c*. Moreover, the right side surface portion-side light source unit includes the LEDs 20*c* and 20*d*.

Moreover, in the present embodiment, the LEDs 20*a* to 20*d* are respectively provided in the rotor portions 10*a* to 10*d* included in the upper surface portion. That is, the LEDs 20*a* to 20*d* are provided at positions included in the upper surface portion. Thus, the LEDs 20*a* to 20*d* also function as the upper surface portion-side light source provided in the upper surface portion.

[Notification of Assistance Information]

In the present embodiment, the UI presentation unit 35 of the drone 2 controls the operations of the LEDs 20 and the loudspeaker 21, for example, to thereby notify the user 6 of assistance information for assisting the work of the user 6 on the drone 2.

The assistance information includes information regarding at least one of an orientation of the body unit 4 or a position on the body unit 4. In the present embodiment, information regarding the orientation of the body unit 4 and information regarding the position on the body unit 4 are both output as the assistance information.

The information regarding the orientation of the body unit 4 includes information indicating which orientation the drone 2 should be placed in, for example, in a case where the user 6 needs to place the drone 2 in a particular orientation (particular attitude) on the ground or the like for performing the work. For example, the user 6 is notified of information with which the user 6 can intuitively recognize which orientation the user 6 should place the drone 2 in as the assistance information.

Alternatively, the user 6 may be notified of information indicating which orientation the drone 2 has been placed in as the assistance information in order for the user 6 to perform the work.

Otherwise, the user 6 may be notified of any information regarding the orientation of the body unit 4, which can assist the work of the user 6, as the assistance information.

The information regarding the position on the body unit 4 includes information indicating a position of a component that is a work target, for example, in order for the user 6 to perform the work. For example, the user 6 is notified of information with which the user 6 can intuitively recognize which component is the component that is the work target as the assistance information.

For example, the user 6 can also be notified of information indicating a position of a functional component that is a replacement work target as the assistance information. Alternatively, the user 6 may be notified of information indicating a position of a functional component that is a maintenance target as the assistance information.

Otherwise, the user 6 may be notified of any information regarding the position on the body unit 4, which can assist the work of the user 6, as the assistance information.

It should be noted that functional components provided in the body unit 4 include the respective devices and the like included in the propellers 5, the motors 19, and the sensor unit 24. Moreover, the functional components also include the LEDs 20 and the loudspeaker 21 that function as the notification unit.

The user 6 may be notified of information different from the information regarding the orientation of the body unit 4 and the position on the body unit 4 as the assistance information.

In the present embodiment, the user 6 is notified of information regarding progress of the work of the user 6 on the drone 2 as the assistance information by controlling the operations of the LEDs 20, for example.

For example, the user 6 is notified of the information indicating that the work of the user 6 on the drone 2 has been completed as the assistance information.

Moreover, in a case where the work of the user 6 on the drone 2 has failed, the user 6 is notified of information indicating that the work of the user 6 on the drone 2 has failed as the assistance information.

Moreover, in a case where the work of the user 6 on the drone 2 includes a plurality of steps, the user 6 is notified of information indicating that the step has been completed with respect to each of the plurality of steps as the assistance information.

Moreover, in a case where the work of the user 6 on the drone 2 includes a plurality of steps, the user 6 is notified of information indicating that the step has failed with respect to each of the plurality of steps as the assistance information.

It may be possible to notify of all these types of assistance information or may be possible to notify of any one of them.

The UI presentation unit 35 controls light-up of the four LEDs 20*a* to 20*d* that function as the light source device, to thereby notify the user 6 of a variety of assistance information described above. For example, the UI presentation unit 35 is capable of notifying of a wide variety of assistance information by controlling light-up patterns of the four LEDs 20*a* to 20*b*.

Moreover, the UI presentation unit 35 notifies the user 6 of a variety of assistance information by controlling the sound output from the motors 19 in a state in which the propellers 5 have been detached and the loudspeaker 21, which function as the sound output device. For example, the UI presentation unit 35 is capable of notifying of a wide variety of assistance information by outputting voice information including the contents of the assistance information or outputting various sounds such as buzzers, notification sounds, and error sounds.

Notification Example of Assistance Information

Figure 6:
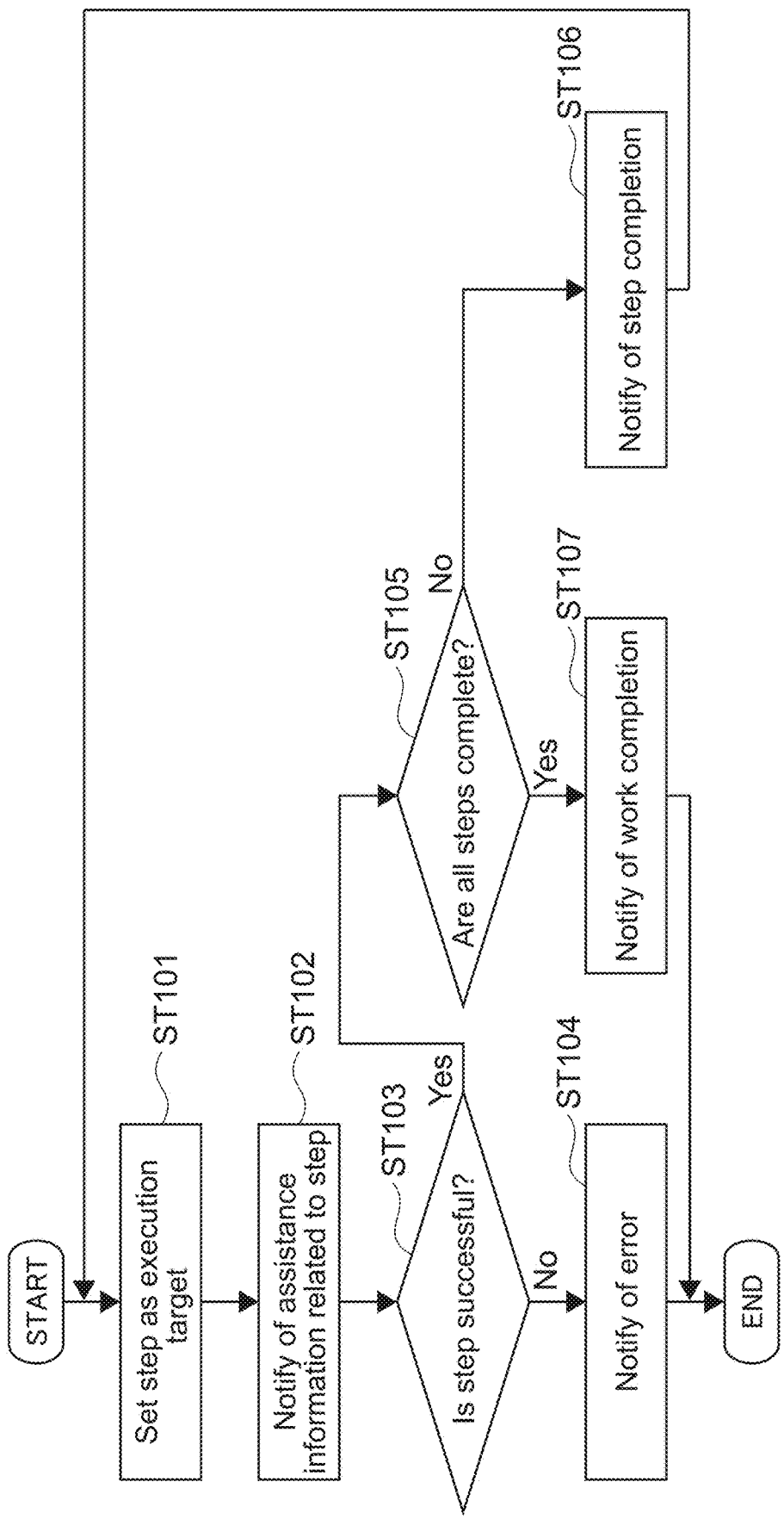
FIG. 6 A flowchart showing a notification operation example of assistance information.

FIG. 6 is a flowchart showing a notification operation example of the assistance information.

Hereinafter, notification of the assistance information shown in FIG. 4 will be described using calibration work as an example.

[Assistance of Calibration Work]

In the present embodiment, assistance information for assisting calibration work on the sensor unit 24 can be output.

Figure 7:
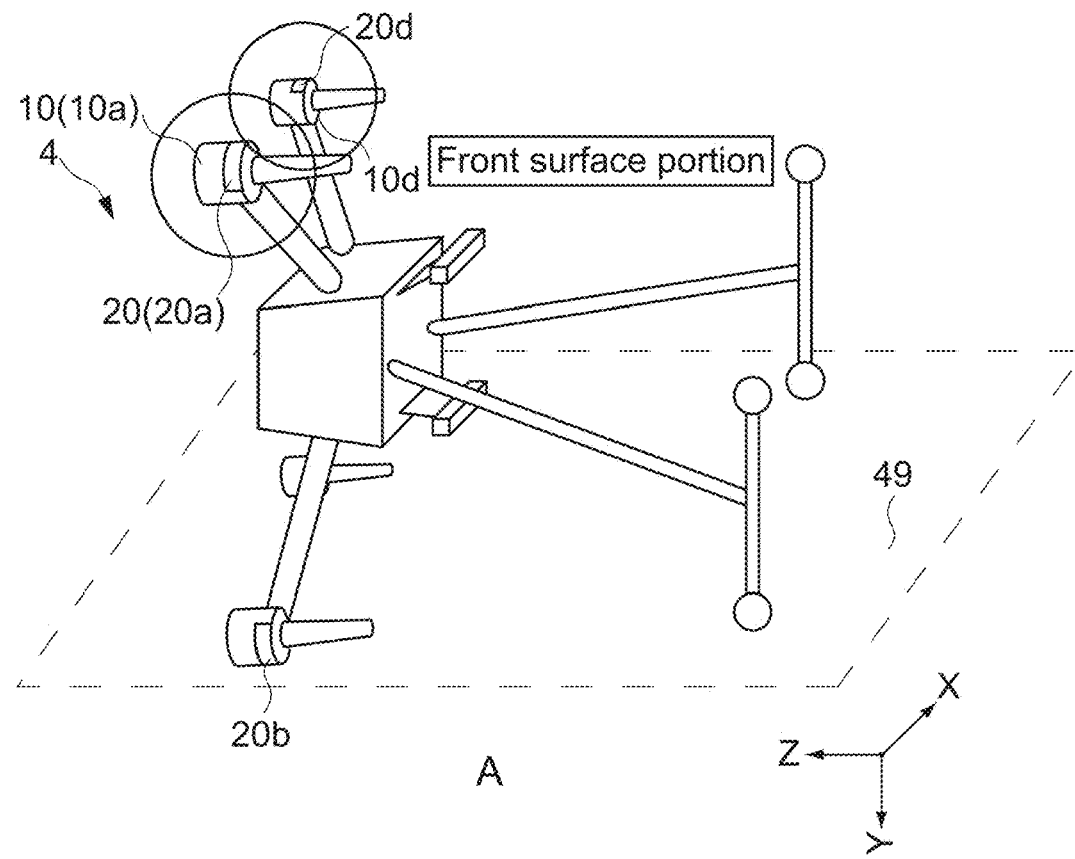
FIG. 7 A schematic view for describing an example of calibration work on an inertial sensor.
Figure 7:
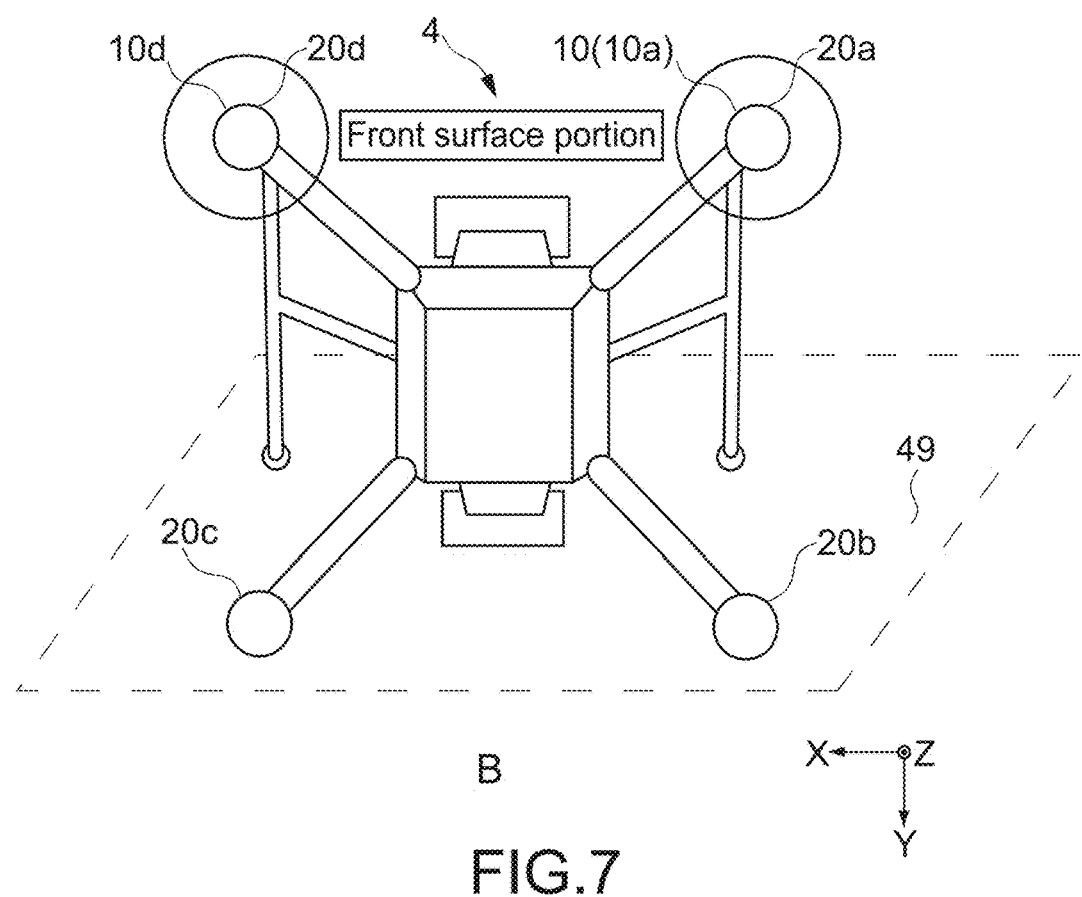
Figure 8:
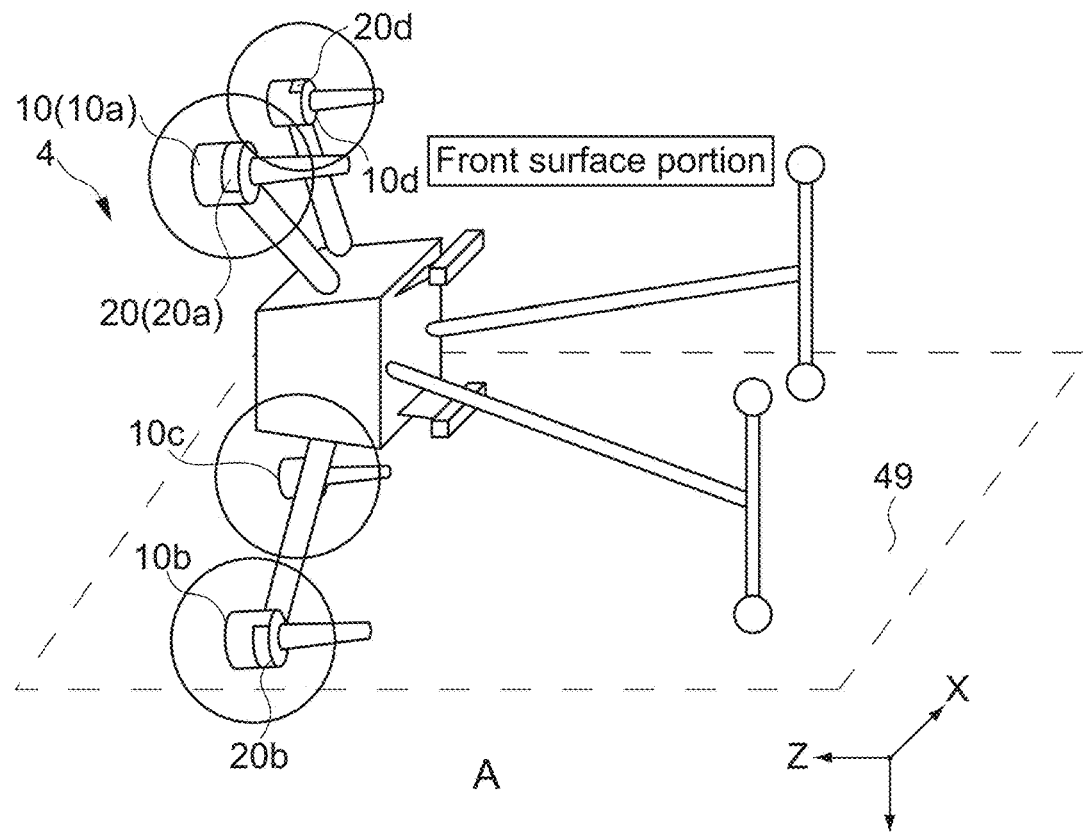
FIG. 8 A schematic view for describing an example of the calibration work on the inertial sensor.
Figure 8:
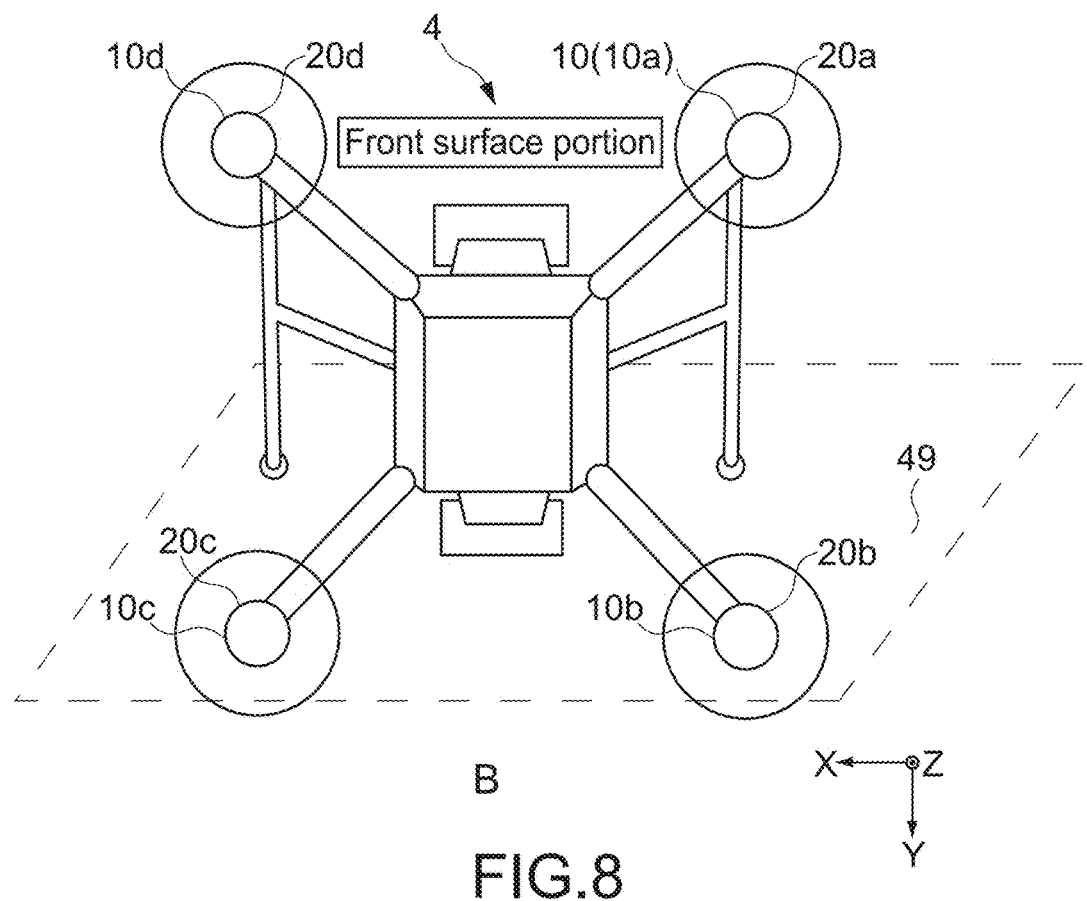
Figure 9:
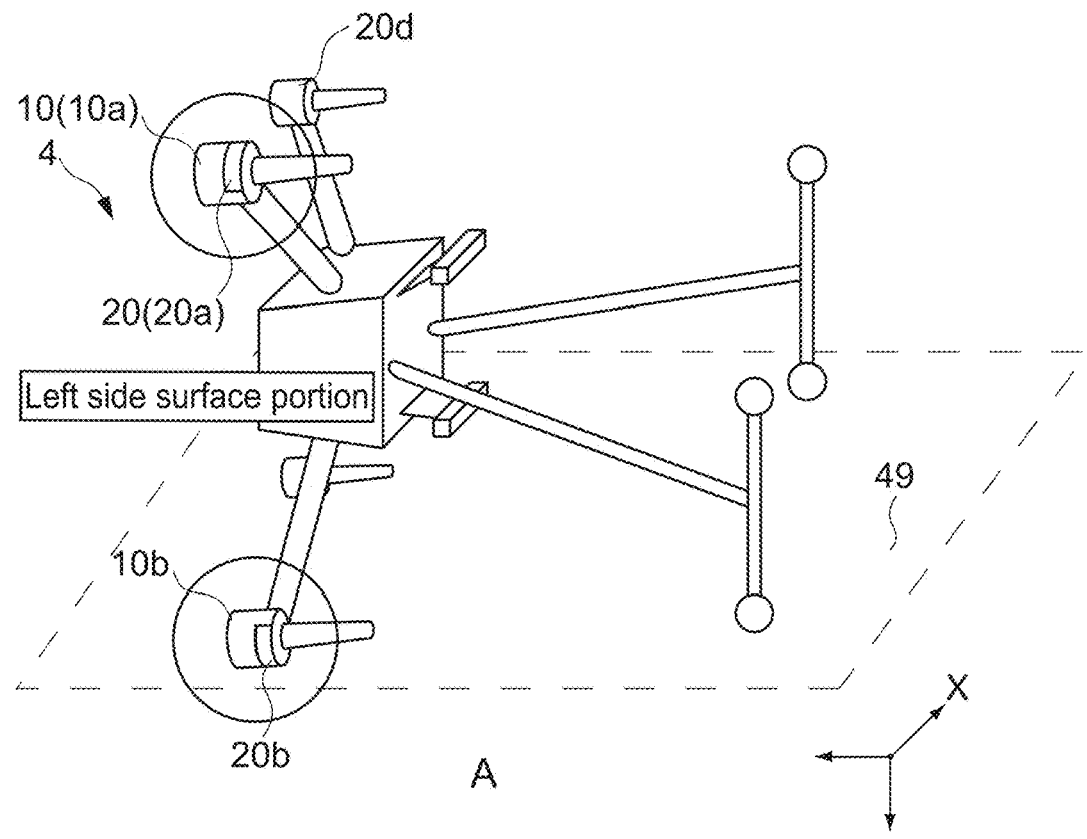
FIG. 9 A schematic view for describing an example of the calibration work on the inertial sensor.
Figure 9:
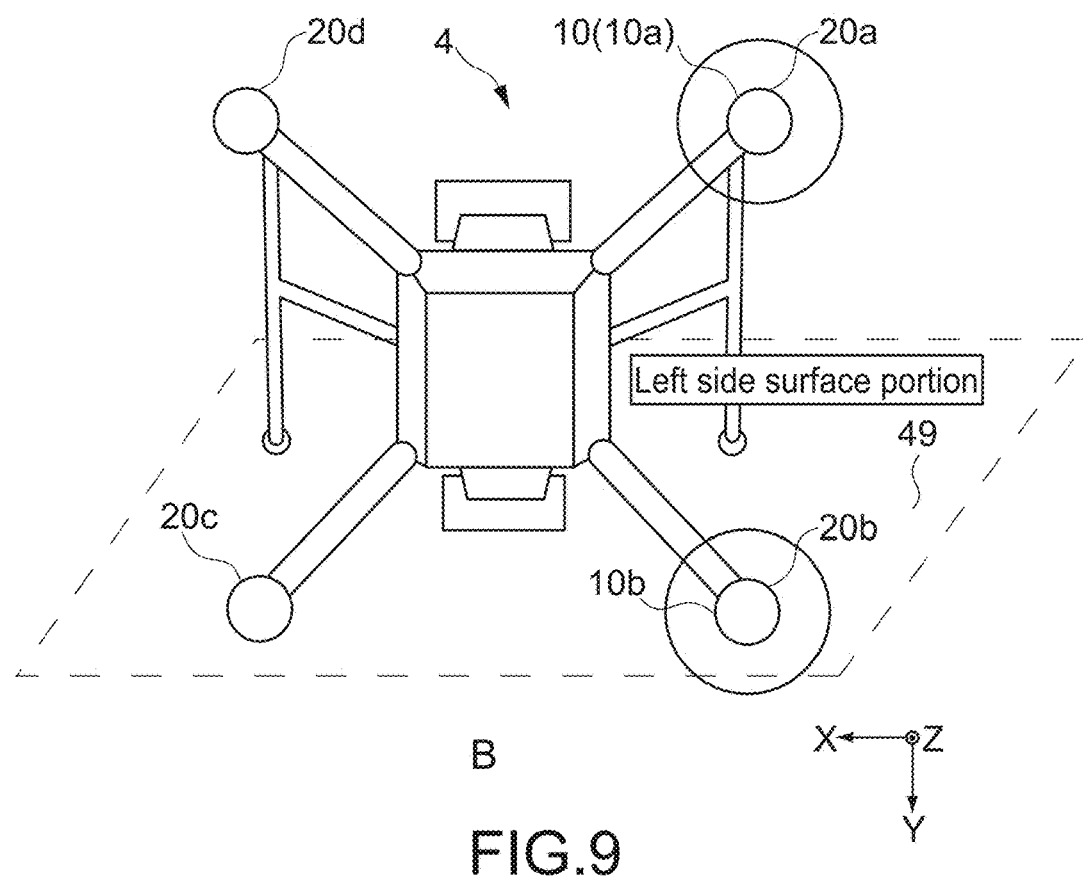

FIGS. 7 to 9 are schematic views for describing an example of calibration work on the inertial sensor 26. It should be noted that FIGS. 7 to 9 schematically show XYZ-coordinate axes (show the XYZ-coordinate axes not reflecting a slight tilt of the body unit 4) for easy understanding of the orientation of the body unit 4.

In the present embodiment, the calibration work on the inertial sensor 26 is performed in a state in which the propellers 5 and the main camera 30 (3-axis gimbal 31) are detached.

First of all, the user 6 operates the control device 3 and starts the application for controlling the operation of the drone 2.

The user 6 inputs an instruction to calibrate the inertial sensor 26 by a predetermined touch operation or voice input.

The work instruction unit 46 of the control device 3 sends the instruction to execute calibration processing on the inertial sensor 26 to the drone 2. As a result, the drone 2 is set on a mode to execute the calibration processing on the inertial sensor 26.

The calibration processing unit 34 of the drone 2 sets a step that is an execution target (Step 101).

In the present embodiment, the calibration work on the inertial sensor 26 includes a plurality of steps. Specifically, the user 6 places the body unit 4 on a ground 49 in different orientations multiple times. Then, the inertial sensor 26 executes measurement in a state in which the body unit 4 is placed on the ground 49 in each orientation. The inertial sensor 26 is calibrated on the basis of a measurement result corresponding to each orientation.

As a matter of course, the calibration work and the calibration processing performed by the user 6 for calibrating the inertial sensor 26 are not limited.

In Step 101, first of all, a step in which the inertial sensor 26 executes measurement is set as the step that is the execution target in a state in which the body unit 4 is placed on the ground 49 with the front surface portion of the body unit 4 oriented upwards.

It should be noted that the portion of the body unit 4 oriented upwards corresponds to a portion that is on a side opposite to the ground 49.

The UI presentation unit 35 notifies of assistance information related to the step (Step 102).

In the present embodiment, the UI presentation unit 35 is capable of notifying of a portion that is on a side opposite to the ground 49 out of the front surface portion, the left side surface portion, the rear surface portion, and the right side surface portion by controlling light-up of each of the LEDs 20a to 20d.

Specifically, as shown in FIGS. 7A and B, the rotor portions 10a and 10d provided in the LEDs 20a and 20d, which are included in the front surface portion, are lit up. For example, the LEDs 20a and 20d are lit up in blue.

Moreover, in the present embodiment, a predetermined notification sound is output by rotating the rotor portions 10a and 10d provided in the motors 19.

Moreover, in the present embodiment, the loudspeaker 21 outputs a voice saying "Place the drone on the ground with the front surface portion where the LED is lit up oriented upwards".

Notified of such assistance information, the user 6 can intuitively recognize that the user 6 should place the body unit 4 on the ground 49 with the front surface portion oriented upwards.

Moreover, in the present embodiment, the control device 3 also notifies of the assistance information by cooperation of the UI presentation unit 35 of the drone 2 with the UI presentation unit 47 of the control device 3.

For example, the loudspeaker 39 of the control device 3 also outputs a voice saying "Place the drone on the ground with the front surface portion where the LED is lit up oriented upwards".

Moreover, the touch panel 7 displays a text indicating that the body unit 4 should be placed on the ground 49 with the front surface portion oriented upwards or an image in which the body unit 4 is placed on the ground 49 with the front surface portion oriented upwards.

The calibration processing unit 34 determines whether or not the step is successful (Step 103). That is, the calibration processing unit 34 determines whether or not the inertial sensor 26 has appropriately executed the measurement in a state in which the body unit 4 is placed on the ground 49 with the front surface portion of the body unit 4 oriented upwards.

For example, in a case where the inertial sensor 26 has not appropriately executed the measurement, the step is determined to have failed. For example, in a case where a measurement result from the inertial sensor 26 is determined to be inappropriate as a measurement result in the state in which the front surface portion of the body unit 4 is oriented upwards, the step is determined to have failed. For example, in a case where any one of the left side surface portion, the rear surface portion, or the right side surface portion other than the front surface portion is oriented upwards, the step is determined to have failed.

In a case where the step is determined to have failed (No in Step 103), the user is notified of information indicating an error as the assistance information (Step 104).

In the present embodiment, the LEDs 20a and 20d on the side of the front surface portion are displayed in a highlighted manner. For example, the LEDs 20a and 20d are lit up in red. Otherwise, the user is notified of the error by controlling light-up of the LEDs 20a to 20d.

Moreover, a predetermined error sound is output by rotating the motors 19 provided in the rotor portions 10a and 10b.

Moreover, the loudspeaker 21 outputs a voice saying "The calibration has failed, so check the orientation of the drone".

The assistance information indicating the error corresponds to the assistance information indicating that the step has failed.

Notified of such assistance information, the user 6 can intuitively recognize that the step of the calibration work has failed. This enables the user to easily modify the orientation of the body unit 4.

The method of notifying of the assistance information indicating the error is not limited, and may be arbitrarily set. As a matter of course, the control device 3 may also be notified of the assistance information indicating the error.

In the present embodiment, in a case where the user has been notified of the assistance information indicating the error, the calibration processing is terminated as shown in FIG. 6. Thus, the assistance information indicating the error also corresponds to the assistance information indicating that the work of the user 6 on the drone 2 has failed.

In a case where it is determined that the step is successful (Yes in Step 103), whether or not all steps of the calibration work have been completed is determined (Step 105).

Here, not all steps of the calibration work have been completed, so Step 105 is No and the processing proceeds to Step 106.

In Step 106, the user is notified of the assistance information indicating that the step has been completed.

In the present embodiment, the four LEDs 20*a* to 20*d* are lit up in a predetermined light-up pattern as shown in FIGS. 8A and B. For example, the four LEDs 20*a* to 20*d* are lit up in green.

Moreover, a predetermined notification sound is output by rotating the motors 19 provided in the four rotor portions 10*a* to 10*d*.

Moreover, the loudspeaker 21 outputs a voice saying "the step has been completed, so move to next step".

Notified of such assistance information, the user 6 can intuitively recognize the success of the step of the calibration work and the progress of the calibration work.

The method of notifying of the assistance information indicating that the step has been completed is not limited, and may be arbitrarily set. As a matter of course, the control device 3 may also notify of the assistance information indicating that the step has been completed.

Returning to Step 101, a step that is an execution target is set.

In the present embodiment, a step in which the inertial sensor 26 executes measurement in a state in which the body unit 4 is placed on the ground 49 with the left side surface portion of the body unit 4 oriented upwards is set as the next step.

In Step 102, the user is notified of assistance information related to the step.

In the present embodiment, the LEDs 20*a* and 20*b* provided in the rotor portions 10*a* and 10*b*, which are included in the left side surface portion, are lit up as shown in FIGS. 9A and B. For example, the LEDs 20*a* and 20*b* are lit up in blue. Otherwise, the motors 19 output a predetermined notification sound or the loudspeaker 21 outputs a predetermined voice. The control device 3 also notifies of the assistance information.

This enables the user 6 to intuitively recognize that the user 6 should place the body unit 4 on the ground 49 with the left side surface portion oriented upwards.

In Step 103, in a case where it is determined that the step has failed, the user is notified of information indicating an error as the assistance information (Step 104). For example, the LEDs 20*a* and 20*c* are lit up in red. Otherwise, the motors 19 output a predetermined error sound or the loudspeaker 21 outputs a predetermined voice. The control device 3 also notifies of the assistance information.

This enables the user 6 to intuitively recognize that the step of the calibration work has failed.

In a case where the user 6 has changed the orientation of the body unit 4 so that the left side surface portion is oriented upwards and the inertial sensor 26 has appropriately executed the measurement, it is determined that the step is successful.

At this time, still not all steps of the calibration work have been completed, so Step 105 is No and the processing proceeds to Step 106.

In Step 106, the user is notified of the assistance information indicating that the step has been completed. For example, the four LEDs 20*a* to 20*d* are lit up in green. Otherwise, the motors 19 output a predetermined notification sound or the loudspeaker 21 outputs a predetermined voice. The control device 3 also notifies of the assistance information.

This enables the user 6 to intuitively recognize the success of the step of the calibration work and the progress of the calibration work.

Returning to Step 101, a step that is an execution target is set.

In the present embodiment, a step in which the inertial sensor 26 executes measurement in a state in which the body unit 4 is placed on the ground 49 with the rear surface portion of the body unit 4 oriented upwards is set as the next step.

In Step 102, the user is notified of assistance information related to the step.

In the present embodiment, the LEDs 20*b* and 20*c* provided in the rotor portions 10*b* and 10*c*, which are included in the rear surface portion, are lit up. For example, the LEDs 20*b* and 20*c* are lit up in blue. Otherwise, the motors 19 output a predetermined notification sound or the loudspeaker 21 outputs a predetermined voice. The control device 3 also notifies of the assistance information.

This enables the user 6 to intuitively recognize that the user 6 should place the body unit 4 on the ground 49 with the rear surface portion oriented upwards.

In Step 103, in a case where it is determined that the step has failed, the user is notified of information indicating an error as the assistance information (Step 104). For example, the LEDs 20*b* and 20*c* are lit up in red. Otherwise, the motors 19 output a predetermined error sound or the loudspeaker 21 outputs a predetermined voice. The control device 3 also notifies of the assistance information.

This enables the user 6 to intuitively recognize that the step of the calibration work has failed.

In a case where the user 6 has changed the orientation of the body unit 4 so that the rear surface portion is oriented upwards and the inertial sensor 26 has appropriately executed the measurement, it is determined that the step is successful.

At this time, still not all steps of the calibration work have been completed, so Step 105 is No and the processing proceeds to Step 106.

In Step 106, the user is notified of the assistance information indicating that the step has been completed. For example, the four LEDs 20*a* to 20*d* are lit up in green. Otherwise, the motors 19 output a predetermined notification sound or the loudspeaker 21 outputs a predetermined voice. The control device 3 also notifies of the assistance information.

This enables the user 6 to intuitively recognize the success of the step of the calibration work and the progress of the calibration work.

Returning to Step 101, a step that is an execution target is set.

In the present embodiment, a step in which the inertial sensor 26 executes measurement in a state in which the body unit 4 is placed on the ground 49 with the right side surface portion of the body unit 4 oriented upwards is set as the next step.

In Step 102, the user is notified of assistance information related to the step.

In the present embodiment, the LEDs 20*c* and 20*d* provided in the rotor portions 10*c* and 10*d*, which are included in the right side surface portion, are lit up. For example, the LEDs 20*c* and 20*d* is lit up in blue. Otherwise, the motors 19 output a predetermined notification sound or the loudspeaker 21 outputs a predetermined voice. The control device 3 also notifies of the assistance information.

This enables the user 6 to intuitively recognize that the user 6 should place the body unit 4 on the ground 49 with the right side surface portion oriented upwards.

In Step 103, in a case where it is determined that the step has failed, the user is notified of information indicating an error as the assistance information (Step 104). For example, the LEDs 20*c* and 20*d* are lit up in red. Otherwise, the motors 19 output a predetermined error sound or the loudspeaker 21 outputs a predetermined voice. The control device 3 also notifies of the assistance information.

This enables the user 6 to intuitively recognize that the step of the calibration work has failed.

In a case where the user 6 has changed the orientation of the body unit 4 so that the right side surface portion is oriented upwards and the inertial sensor 26 has appropriately executed the measurement, it is determined that the step is successful.

In the present embodiment, the calibration of the inertial sensor 26 is completed at this time. Thus, in Step 105, it is determined that all steps of the calibration work have been completed (Yes) and the processing proceeds to Step 107.

In Step 107, the user is notified of the assistance information indicating that the work of the user 6 on the drone 2 has been completed. That is, the user is notified of the assistance information indicating that the calibration work on the inertial sensor 26 has been completed.

In the present embodiment, the four LEDs 20a to 20d are lit up in a predetermined light-up pattern. For example, the four LEDs 20a to 20d are lit up in the order of green, red, and blue.

Moreover, rotation of the motors 19 provided in the four rotor portions 10a to 10d outputs a predetermined notification sound.

Moreover, the loudspeaker 21 outputs a voice saying "the calibration work has been completed, good work".

Notified of such assistance information, the user 6 can intuitively recognize that the calibration work has been completed with no issues.

The method of notifying of the assistance information indicating that the work of the user 6 on the drone 2 has been completed is not limited, and may be arbitrarily set. As a matter of course, the control device 3 may also notify of the assistance information indicating that the work of the user 6 on the drone 2 has been completed.

As described above, in the present embodiment, the UI presentation unit 35 is capable of notifying of a portion that is on a side opposite to the ground 49 out of the front surface portion, the left side surface portion, the rear surface portion, and the right side surface portion with respect to the work of placing the body unit 4 on the ground 49 by controlling light-up of each of the LEDs 20a to 20d.

In the present embodiment, the calibration work on the compass 27 can also be assisted.

The user 6 inputs an instruction to calibrate the compass 27 and the drone 2 is set on a mode to execute the calibration processing on the compass 27.

In Step 101 shown in FIG. 6, a step that is an execution target is set.

In the present embodiment, the user 6 retains the body unit 4 so that the front surface portion of the body unit 4 is oriented toward the user 6. Then, the user 6 makes an operation to rotate the body unit 4 by 360 degrees counter-clockwise in that place while retaining the body unit 4. A step in which the compass 27 executes measurement during that operation is set as the step that is the execution target.

As a matter of course, the calibration work and the calibration processing performed by the user 6 for calibrating the compass 27 are not limited.

The UI presentation unit 35 notifies of assistance information related to the step (Step 102).

In the present embodiment, the rotor portions 10a and 10d provided in the LEDs 20a and 20d, which are included in the front surface portion, are lit up. For example, the LEDs 20a and 20d are lit up in blue.

Moreover, in the present embodiment, a predetermined notification sound is output by rotating the rotor portions 10a and 10d provided in the motors 19.

Moreover, in the present embodiment, the loudspeaker 21 outputs a voice saying "Orient the front surface portion with the LED lit-up toward yourself and rotate it counter-clockwise in that place".

Notified of such assistance information, the user 6 can intuitively recognize the portion to be oriented toward his or herself.

As a matter of course, the control device 3 may also notify of the assistance information.

The calibration processing unit 34 determines whether or not the step is successful (Step 103).

For example, in a case where the inertial sensor 26 has not appropriately executed the measurement, the step is determined to have failed. For example, in a case where any one of the left side surface portion, the rear surface portion, or the right side surface portion other than the front surface portion is oriented toward the user 6, the step is determined to have failed.

In a case where the step is determined to have failed (No in Step 103), the user is notified of information indicating an error as the assistance information (Step 104).

In the present embodiment, the LEDs 20a and 20d on the side of the front surface portion are displayed in a highlighted manner. For example, the LEDs 20a and 20d are lit up in red. Otherwise, the user is notified of the error by controlling light-up of the LEDs 20a to 20d.

Moreover, a predetermined error sound is output by rotating the motors 19 provided in the rotor portions 10a and 10b.

Moreover, the loudspeaker 21 outputs a voice saying "The calibration has failed, so check the orientation of the drone".

The assistance information indicating the error corresponds to the assistance information indicating that the step has failed.

Notified of such assistance information, the user 6 can intuitively recognize that the calibration work has failed. This enables the user to easily modify the orientation of the body unit 4.

The method of notifying of the assistance information indicating the error is not limited, and may be arbitrarily set. As a matter of course, the control device 3 may also be notified of the assistance information indicating the error.

In a case where it is determined that the step is successful (Yes in Step 103), whether or not all steps of the calibration work have been completed is determined (Step 105).

In the present embodiment, the calibration of the compass 27 is completed at this time. Thus, in Step 105, it is determined that all steps of the calibration work have been completed (Yes) and the processing proceeds to Step 107.

In Step 107, the user is notified of the assistance information indicating that the work of the user 6 on the drone 2 has been completed. That is, the user is notified of the assistance information indicating that the calibration work on the compass 27 has been completed.

In the present embodiment, the four LEDs 20a to 20d are lit up in a predetermined light-up pattern. For example, the four LEDs 20a to 20d are lit up in the order of green, red, and blue.

Moreover, a predetermined notification sound is output by rotating the motors 19 provided in the four rotor portions 10a to 10d.

Moreover, the loudspeaker 21 outputs a voice saying "the calibration work has been completed, good work".

Notified of such assistance information, the user 6 can intuitively recognize that the calibration work has been completed with no issues.

The method of notifying of the assistance information indicating that the work of the user 6 on the drone 2 has been completed is not limited, and may be arbitrarily set. As a matter of course, the control device 3 may also notify of the assistance information indicating that the work of the user 6 on the drone 2 has been completed.

As described above, in the present embodiment, the UI presentation unit 35 is capable of notifying of a portion that is the side oriented toward the user 6 out of the front surface portion, the left side surface portion, the rear surface portion, and the right side surface portion by controlling light-up of each of the LEDs 20a to 20d with respect to the work of retaining the body unit 4 and performing a predetermined motion.

[Assistance for Replacement Work of Component]

For example, the replacement work of the propellers 5a to 5d corresponding to the functional components can also be assisted. The propellers 5a to 5d are respectively mounted on the rotor portions 10a to 10d.

The user 6 inputs an instruction to execute the replacement work of the propellers 5 and the drone 2 is set on a mode to execute the replacement processing of the propellers 5.

The UI presentation unit 35 of the drone 2 determines a propeller 5 of the propellers 5a to 5d, which needs to be replaced. In a case where a propeller 5 needs to be replaced, the LED 20 provided in the rotor portion 10 mounted on the propeller 5 that needs to be replaced is lit up.

This enables the user 6 to intuitively recognize the position of the propeller 5 that is a replacement work target.

As a matter of course, a predetermined notification sound may be output by rotating the motor 19 provided in the rotor portion 10 mounted on the propeller 5 that needs to be replaced. Moreover, the loudspeaker 21 may output a voice indicating the propeller 5 that needs to be replaced. The control device 3 may also notify of the assistance information.

It should be noted that the rotor portions 10a to 10d provided with the propellers 5a to 5d correspond to embodiments of a plurality of retaining units that retains the plurality of propellers.

Moreover, each of the four LEDs 20a to 20d corresponds to an embodiment of a light source provided in each of the plurality of retaining units.

Otherwise, a variety of work of the user 6 on the drone 2 can be assisted by applying the present technology.

The user can be notified of the assistance information indicating the position of the stereo camera 28 of the four stereo cameras 28, which is a calibration work target, for example when calibrating the four stereo cameras 28 for the front side, for the left-hand side, for the rear side, and for the right-hand side in the stated order.

For example, the user can be notified of the position of the stereo camera 28 for the front side by lighting up the LEDs 20a and 20d.

The user can be notified of the position of the stereo camera 28 for the left-hand side by lighting up the LEDs 20a and 20b.

The user can be notified of the position of the stereo camera 28 for the rear side by lighting up the LEDs 20b and 20c.

The user can be notified of the position of the stereo camera 28 for the right-hand side by lighting up the LEDs 20c and 20d.

As a matter of course, the user may be notified of the assistance information by a sound from the motors 19 or the loudspeaker 21. Moreover, the control device 3 may notify of the assistance information.

Moreover, work of adjusting the position of the main camera 30 or the 3-axis gimbal 31 with respect to the main body portion 8 can also be assisted.

For example, in a case where it is better to move the main camera 30 forwards, the user can be notified of the movement direction by lighting up the LEDs 20a and 20d.

For example, in a case where it is better to move the main camera 30 leftwards, the user can be notified of the movement direction by lighting up the LEDs 20a and 20b.

For example, in a case where it is better to move the main camera 30 rearwards, the user can be notified of the movement direction by lighting up the LEDs 20b and 20d.

For example, in a case where it is better to move the main camera 30 rightwards, the user can be notified of the movement direction by lighting up the LEDs 20c and 20d.

In this manner, the user can also be notified of information indicating the direction of moving the functional component as assistance information for assisting work of moving the functional component.

As a matter of course, the user may be notified of the assistance information by a sound from the motors 19 or the loudspeaker 21. Moreover, the control device 3 may notify of the assistance information.

It should be noted that the movement also includes a rotational movement in the present disclosure. That is, the movement includes not only a change in position but also a change in orientation at the same position. Moving the object includes not only moving a linearly movable object but also rotating an object configured to be rotatable, for example. Moreover, the movement direction includes a direction of rotation.

In the present embodiment, moving the body unit 4 moves the functional components such as the respective devices of the propellers 5 and the sensor unit 24. Thus, the work of moving the functional component includes work of moving the body unit 4.

Therefore, the work of moving the functional component includes the work of changing the orientation of the body unit 4 and placing the body unit 4 on the ground 49 at the time of the calibration of the inertial sensor 26 described above. Moreover, the work of moving the functional component also includes work of rotating the front surface portion toward the user once at the time of the calibration of the compass 27.

Moreover, in a case where maintenance work of checking the state of each of the four propellers 5a to 5d is performed, the LED 20 set on the lower side of the propeller 5 on which the maintenance work is being performed is lit up in a predetermined light-up pattern. This enables the user to intuitively recognize the position of the propeller 5 of the four propellers 5a to 5d where the maintenance work is being performed.

Moreover, the LED 20 set on the lower side of the propeller 5 whose maintenance has been completed is lit up in a predetermined light-up pattern. This enables the user to recognize the position of the propeller 5 whose maintenance has been completed. As a result, the user can intuitively recognize the progress of the maintenance work on the four propellers 5a to 5d.

As a matter of course, the user may be notified of the assistance information by a sound from the motors 19 or the loudspeaker 21. Moreover, the control device 3 may notify of the assistance information.

Hereinabove, in the drone 2 according to the present embodiment, the user is notified of information regarding at least one of the orientation of the body unit 4 or the position on the body unit 4 as the assistance information for assisting the work of the user 6 on the drone 2 by controlling the operation of the notification unit (the motors 19, the LEDs 20, the loudspeaker 21) provided in the body unit 4. This allows improvement in the workability in user's work on the drone 2.

For example, when calibrating the inertial sensor 26 and the compass 27, only the touch panel 7 of the control device 3 displays a procedure of the work performed by the user 6. The user 6 performs a plurality of steps, e.g., placing the body unit 4 on the ground in a particular orientation while seeing the procedure displayed on the touch panel 7.

For example, the touch panel 7 executes display, e.g., "Place the drone on the ground with the neck side (front surface side) oriented upwards" and "Next, place the drone on the ground with the left side surface side oriented upwards".

The user 6 checks a step that the user 6 should perform by looking at the touch panel 7 and performs the step by moving the body unit 4 with his or her hand. When the step has been completed, the user 6 checks the next step by looking at the touch panel 7 again and moves the body unit 4 with his or her hand again.

With such a method, it is very difficult to check what type of operation should be performed as the next step while looking at the touch panel 7 in a case of performing work on a large-size drone 2.

Moreover, as to the instruction "Next, place the drone on the ground with the left side surface side oriented upwards", which side is the left side surface side of the body unit 4 can also be unclear and difficult to intuitively recognize. In such a case, the usability (workability) is deteriorated as to the work on the drone 2 such as calibration work.

In the drone 2 according to the present embodiment, the notification unit (the motors 19, the LEDs 20, the loudspeaker 21) is configured in the drone 2. Then, the user is notified of a variety of assistance information described above by controlling the notification unit.

For example, combining light-up patterns of the plurality of LEDs 20a to 20d enables the user 6 to intuitively recognize which orientation the body unit 4 should be placed in. For example, the LEDs 20a and 20b are blinked. This enables the user 6 to perform the work according to the instruction "Orient the left side surface side upwards and place the drone on the ground" only by orienting upwards the side on which the LEDs 20a and 20b are blinking without taking care of whether it is the left side surface side or the right side surface side of the body unit 4.

Moreover, combining the light-up patterns of the plurality of the LEDs 20a to 20d enables the user to intuitively recognize the progress of the work (e.g., completion of each step) or the failure of the work (e.g., failure of each step) without seeing the touch panel 7.

Moreover, the sound output from the motors 19 or the loudspeaker 21 enables the user to intuitively recognize the portion or position that is the work target, the progress of the work, or whether a failure has occurred, for example.

For example, at the time of completion of each step, at the time of completion of all steps, or at the time of occurrence of an error/failure, the LED display is executed in different patterns (e.g., green light-up for two seconds at the time of completion, yellow light-up for two seconds at the time of completion, occurrence of an error/failure). Moreover, sound reproduction in different patterns is executed. This enables the user to more intuitively recognize the progress.

Applying the present technology enables the user 6 to intuitively recognize what type of work the user 6 should perform for achieving his or her aim with a visual or auditory expression from the drone 2 even without looking at the touch panel 7. Moreover, the user 6 can intuitively recognize what type of state the drone 2 is at the current time.

The user 6 can recognize progress of the work or a next procedure to execute only with a visual or auditory expression from the drone 2. It is thus possible to complete each step of the work without the need for checking the touch panel 7 every time.

Moreover, the configuration that enables the user to intuitively recognize how to operate the drone can sufficiently prevent the user from performing a wrong procedure.

As it has been also described above, the present technology is not limited to the calibration of the sensor unit 24, and the present technology can be applied to a variety of work on the drone 2.

Other Embodiments

The present technology is not limited to the above-mentioned embodiments, and various other embodiments can be achieved.

In the above description, in the calibration of the inertial sensor 26, the user is notified of a portion that is on a side opposite to the ground 49 out of the front surface portion, the left side surface portion, the rear surface portion, and the right side surface portion with respect to the work of placing the body unit 4 on the ground 49 by controlling light-up of each of the front surface portion-side light source (the LEDs 20a and 20d), the left side surface portion-side light source (the LEDs 20a and 20b), the rear surface portion-side light source (the LEDs 20b and 20c), and the right side surface portion-side light source (the LED 20c and 20a).

The number of front surface portion-side light sources provided in the front surface portion and the position(s) of the front surface portion-side light source(s), the number of left side surface portion-side light sources provided in the left side surface portion and the position(s) of the left side surface portion-side light source(s), the number of rear surface portion-side light sources provided in the rear surface portion and the position(s) of the rear surface portion-side light source(s), and the like are not limited. The front surface portion-side light source may be provided at any position on the front surface portion and the left side surface portion-side light source may be provided at any position on the left side surface portion. Moreover, the rear surface portion-side light source may be provided at any position on the rear surface portion and the left side surface portion-side light source may be provided at any position on the left side surface portion.

In any case, controlling light-up of each of the front surface portion-side light source, the left side surface portion-side light source, the rear surface portion-side light source, and the right side surface portion-side light source allows notification of the assistance information.

A variety of shapes can be employed as the outer shape for configuring the movable object such as the drone 2. In the present embodiment, the drone 2 is configured, centered at the main body portion 8 having a substantially rectangular parallelepiped shape as shown in FIG. 1. The present technology is not limited to such a shape, and the drone 2 or the like having a shape in which the respective portions of the body unit 4 are mainly constituted of curved surfaces, e.g., a configuration centered at the main body portion 8 having a substantially spherical shape may be employed.

As a matter of course, the present technology can also be applied to the drone 2 or the like with such a shape, and it can be configured as the movable object according to the present technology.

For example, as described above, the front surface portion, the left side surface portion side, the rear surface portion, the right side surface portion, the upper surface portion, and the lower surface portion can be defined. Moreover, for example, the curved surface included in each of the front surface portion, the left side surface portion side, the rear surface portion, the right side surface portion, the upper surface portion, and the lower surface portion can be provided with an LED or the like and a loudspeaker or the like as the notification unit, so as to be capable of notifying the user 6 of a variety of notification information.

In the calibration of the inertial sensor 26 for example, work of placing the body unit 4 so that the upper surface portion or the lower surface portion is on the side opposite to the ground 49 (in other words, on the ground 49 side) is sometimes needed.

Applying the present technology allows notification of a portion that is on a side opposite to the ground 49 out of the upper surface portion and the lower surface portion with respect to the work of placing the body unit 4 on the ground 49 by controlling light-up of each of the upper surface portion-side light source provided in the upper surface portion and the lower surface portion-side light source provided in the lower surface portion, for example.

For example, a configuration in which each of the upper surface portion and the lower surface portion is provided with one or more LEDs may be employed.

In the above-mentioned embodiment, the LEDs 20*a* to 20*d* also function as the upper surface portion-side light source. Thus, for example, lighting up all the LEDs 20*a* to 20*d* enables the user 6 to be notified of an instruction to place the drone so that the upper surface portion is on the side opposite to the ground 49.

As a matter of course, the number of upper surface portion-side light sources provided in the upper surface portion and the position(s) of the upper surface portion-side light source(s) and the number of lower surface portion-side light sources provided in the lower surface portion and the position(s) of the lower surface portion-side light source(s), for example, are not limited, and may be arbitrarily designed.

In the above description, in the calibration of the compass 27, the user is notified of a portion on the side oriented toward the user 6 out of the front surface portion, the left side surface portion, the rear surface portion, and the right side surface portion with respect to the work of retaining the body unit 4 and performing a predetermined motion by controlling light-up of each of the front surface portion-side light source (the LEDs 20*a* and 20*d*), the left side surface portion-side light source (the LEDs 20*a* and 20*b*), the rear surface portion-side light source (the LEDs 20*b* and 20*c*), and the right side surface portion-side light source (the LED 20*c* and 20*a*).

Notifying of the orientation of the body unit 4 retained by the user 6 includes notifying of the portion that is the side oriented toward the user 6.

For example, in the calibration of the compass 27, the work of rotating the drone in that place once with a predetermined portion of the body unit 4 oriented upwards (to a side opposite to the ground 49) is sometimes needed.

Applying the present technology enables the user to be notified of a portion that is on a side opposite to the ground 49 out of the front surface portion, the left side surface portion, the rear surface portion, and the right side surface portion by controlling light-up of each of the front surface portion-side light source, the left side surface portion-side light source, the rear surface portion-side light source, and the right side surface portion-side light source. As a result, the workability of the user 6 can be improved.

As a matter of course, notifying of the orientation of the body unit 4 retained by the user 6 includes notifying of a portion that is on a side opposite to the ground 49.

In the above description, the case where the motors 19, the LEDs 20, the loudspeaker 21 are configured as the notification unit provided in the drone 2 has been described as an example. The present technology is not limited thereto, and only one of these devices may be configured or it may be configured by arbitrarily combining these devices.

Alternatively, any device capable of notifying of the assistance information with a visual or auditory expression other than these devices may be used.

For example, a display device using liquid-crystal, EL, or the like may be used as the notification unit and may be mounted on the drone 2. The configuration in which the display device notifies of a variety of assistance information can improve the workability in user's work on the drone 2.

A device configured separate from the drone 2 may be used in a case of notifying of the assistance information with the auditory expression. In the above-mentioned embodiment, the user is notified of the assistance information through the loudspeaker 39 of the control device 3. This enables the user to perform the work on the drone 2 without looking at the touch panel 7, which improves the workability.

As a matter of course, any other devices may be used.

In the above description, the work instruction is input to the control device 3 in a case where the user 6 performs the calibration work for example. The present technology is not limited thereto, and an operation to perform the work may be input to the drone 2.

In this case, the drone 2 itself functions as an embodiment of the reception unit that receives from the user an instruction to perform the work of the user on the movable object.

Any control method may be employed as the control method for the notification unit for notifying of the assistance information. For example, the four LEDs 20 are sequentially lit up every time the step is completed. Such control is also possible.

In the above description, the drone 2 is an example of the movable object.

The present technology is not limited thereto, and the present technology can also be applied to a compact vehicle, robot, or the like independently movable for the purpose of selling, cleaning, monitoring, or the like in a facility, train, or the like. The present technology can also be applied to a robot movable by rotating wheels and a multi-legged walking robot, for example.

In addition, the present technology can also be applied to any movable object such as an automobile, an electric automobile, a hybrid electric automobile, a motorcycle, a bicycle, a personal transporter, an airplane, a watercraft, a robot, a construction machinery, and an agricultural machinery (tractor).

The configurations such as the drone, control the apparatus, the body unit, the notification unit, and the sensor unit described above with reference to the drawings, the processing flows, and the like, which have been described above with reference to the drawings, and can be arbitrarily modified without departing from the gist of the present technology. That is, any other configurations, algorithms, and the like for carrying out the present technology may be employed.

In the present disclosure, for the sake of easy understanding, the wordings, "substantially", "almost", and "about" are used as appropriate. However, no clear difference is defined between a case with the wordings, "substantially", "almost", and "about" and a case without these wordings.

That is, in the present disclosure, it is assumed that the concepts that define the shape, the size, the position relationship, the state, and the like such as "center", "middle", "uniform", "equal", the "same", "orthogonal", "parallel", "symmetric", "extending", "axial", "columnar", "cylindrical", "ring-shaped", and "annular" are concepts including "substantially center", "substantially middle", "substantially uniform", "substantially equal", "substantially the same", "substantially orthogonal", "substantially parallel", "substantially symmetric", "substantially extending", "substantially axial", "substantially columnar", "substantially cylindrical", "substantially ring-shaped", "substantially annular", and the like.

For example, states included in a predetermined range (e.g., ±10% range) using "completely center", "completely middle", "completely uniform", "completely equal", "completely the same", "completely orthogonal", "completely parallel", "completely symmetric", "completely extending", "completely axial", "completely columnar", "completely cylindrical", "completely ring-shaped", "completely annular", and the like as the bases are also included.

Therefore, also a case where no wordings, "substantially", "almost", and "about" are added can include concepts that can be expressed by adding so-called "substantially", "almost", "about", and the like. On the contrary, states expressed with "substantially", "almost", "about", and the like does not necessarily exclude complete states.

In the present disclosure, the comparative expressions, e.g., "larger than A" or "smaller than A" are expressions encompassing both a concept including a case where it is equal to A and a concept not including a case where it is equal to A. For example, "larger than A" is not limited to the case where not including "equal to A", and also includes "A or more". Moreover, "smaller than A" is not limited to "less than A", and also includes "A or less".

For carrying out the present technology, specific settings and the like only need to be employed as appropriate on the basis of the concepts included in "larger than A" and "smaller than A" so as to provide the above-mentioned effects.

At least two of the features according to the present technology, which have been described above, may be combined. That is, the various features described in the respective embodiments may be arbitrarily combined across the respective embodiments. Moreover, the above-mentioned various effects are merely exemplary and not limitative, and other effects may be provided.

It should be noted that the present technology can also take the following configurations.

(1) A movable object, including:
   a body unit;
   a notification unit provided in the body unit; and
   a notification control unit that controls an operation of the notification unit, to thereby notify of information regarding at least one of an orientation of the body unit or a position on the body unit as assistance information for assisting work of a user on the movable object.

(2) The movable object according to (1), in which the notification control unit controls an operation of the notification unit, to thereby notify of information regarding progress of the work of the user on the movable object as the assistance information.

(3) The movable object according to (2), in which the notification control unit notifies of at least one of information indicating that the work of the user on the movable object has been completed or information indicating that the work of the user on the movable object has failed as the assistance information.

(4) The movable object according to (2) or (3), in which in a case where the work of the user on the movable object includes a plurality of steps, the notification control unit notifies of at least one of information indicating that the step has been completed or information indicating that the step has failed with respect to each of the plurality of steps as the assistance information.

(5) The movable object according to any one of (1) to (4), further including
   a sensor unit, in which
   the assistance information includes information for assisting calibration work on the sensor unit.

(6) The movable object according to (5), in which the sensor unit includes at least one of an inertial sensor, a geomagnetic sensor, or an image sensor.

(7) The movable object according to any one of (1) to (6), further including
   a predetermined functional component provided in the body unit, in which
   the notification control unit notifies of information indicating a direction of moving the functional component as the assistance information for assisting work of moving the functional component.

(8) The movable object according to any one of (1) to (7), in which
   the body unit has a front surface portion, a left side surface portion, a rear surface portion, and a right side surface portion,
   the notification unit has a front surface portion-side light source provided in the front surface portion, a left side surface portion-side light source provided in the left side surface portion, a rear surface portion-side light source provided in the rear surface portion, and a right side surface portion-side light source provided in the right side surface portion, and
   the notification control unit controls light-up of each of the front surface portion-side light source, the left side surface portion-side light source, the rear surface portion-side light source, and the right side surface portion-side light source, to thereby notify of a portion that is on a side opposite to ground out of the front surface portion, the left side surface portion, the rear surface portion, and the right side surface portion with respect to work of placing the body unit on the ground.

(9) The movable object according to (8), in which
   the body unit has an upper surface portion and a lower surface portion,
   the notification unit has an upper surface portion-side light source provided in the upper surface portion and a lower surface portion-side light source provided in the lower surface portion, and the notification control unit controls light-up of each of the upper surface portion-side light source and the lower surface portion-side light source, to thereby notify of a portion that is on a side opposite to ground out of the upper surface portion and the lower surface portion with respect to work of placing the body unit on the ground.

(10) The movable object according to (9), in which
the front surface portion-side light source has a first light source provided at a boundary between the front surface portion and the left side surface portion and a second light source provided at a boundary between the front surface portion and the right side surface portion, the left side surface portion-side light source has the first light source and a third light source provided at a boundary between the left side surface portion and the rear surface portion, the rear surface portion-side light source has the third light source and a fourth light source provided at a boundary between the rear surface portion and the right side surface portion, the right side surface portion-side light source has the second light source and the fourth light source, and the notification control unit controls light-up of each of the first light source, the second light source, the third light source, and the fourth light source, to thereby notify of a portion that is on a side opposite to ground out of the front surface portion, the left side surface portion, the rear surface portion, and the right side surface portion with respect to work of placing the body unit on the ground.

(11) The movable object according to (10), in which
each of the first light source, the second light source, the third light source, and the fourth light source is provided at a position included in the upper surface portion and functions as the upper surface portion-side light source, and the notification control unit controls light-up of each of the first light source, the second light source, the third light source, and the fourth light source, to thereby notify of a portion that is on a side opposite to ground out of the upper surface portion and the lower surface portion with respect to work of placing the body unit on the ground.

(12) The movable object according to any one of (1) to (11), in which
the body unit has a front surface portion, a left side surface portion, a rear surface portion, and a right side surface portion, the notification unit has a front surface portion-side light source provided in the front surface portion, a left side surface portion-side light source provided in the left side surface portion, a rear surface portion-side light source provided in the rear surface portion, and a right side surface portion-side light source provided in the right side surface portion, and the notification control unit controls light-up of each of the front surface portion-side light source, the left side surface portion-side light source, the rear surface portion-side light source, and the right side surface portion-side light source, to thereby notify an orientation of the body unit retained by the user with respect to work of retaining the body unit and performing a predetermined motion.

(13) The movable object according to (12), in which
the notification control unit controls light-up of each of the front surface portion-side light source, the left side surface portion-side light source, the rear surface portion-side light source, and the right side surface portion-side light source, to thereby notify of a portion that is on a side oriented toward the user out of the front surface portion, the left side surface portion, the rear surface portion, and the right side surface portion or notify of a portion that is on a side opposite to ground out of the front surface portion, the left side surface portion, the rear surface portion, and the right side surface portion.

(14) The movable object according to any one of (1) to (13), further including
a plurality of propellers, in which
the body unit includes a plurality of retaining units that retains the plurality of propellers,
the notification unit includes a light source provided in each of the plurality of retaining units, and
the notification control unit controls light-up of the light source provided in each of the plurality of retaining units, to thereby notify of a position of the propeller that is a replacement work target.

(15) The movable object according to any one of (1) to (14), in which
the notification unit includes at least one of a light source device, a sound output device, or a display device, and
the notification control unit controls at least one of light-up of the light source device, sound output of the sound output device, or image display of the display device, to thereby notify of the assistance information.

(16) The movable object according to (15), in which
the light source device includes a plurality of light-emitting diodes, and
the notification control unit controls a light-up pattern of the plurality of light-emitting diodes, to thereby notify of the assistance information.

(17) The movable object according to (15) or (16), further including:
a propeller provided in the body unit; and
a motor that rotates the propeller, in which
the motor functions as the sound output device by rotating and outputting a sound in a state in which the propeller is detached.

(18) The movable object according to any one of (1) to (17) that is configured as a drone.

(19) A notification method, including
controlling an operation of a notification unit provided in a body unit of a movable object, to thereby notify of information regarding at least one of an orientation of the body unit or a position on the body unit as assistance information for assisting work of a user on the movable object.

(20) A notification system, including:
a reception unit that receives from a user an instruction to perform work of the user on a movable object; and
a notification control unit that controls, in a case where the instruction to perform the work of the user on the movable object has been received, an operation of a notification unit provided in the body unit of the movable object, to thereby notify of information regarding at least one of an orientation of the body unit or a position on the body unit as assistance information for assisting work of a user on the movable object.

(21) The movable object according to any one of (1) to (18), in which
the assistance information includes information indicating a position of a component that is a work target of the user.

(22) The movable object according to (21), further including
a predetermined functional component provided in the body unit, in which
the assistance information includes information indicating a position of the functional component that is a replacement work target.

REFERENCE SIGNS LIST 1 drone flight control system
2 drone
3 control device
4 body unit
5 propeller
6 user
7 compass
8 main body section
9 arm portion
10 rotor portion
11 front side retaining unit
12 rear side retaining unit
19 motor
20 LED
21 loudspeaker
24 sensor unit
26 inertial sensor
27 compass
28 stereo camera
29 FVP camera
30 main camera
34 calibration processing unit
35 UI presentation unit
46 work instruction unit
47 UI presentation unit
49 ground

The invention claimed is:

1. A movable object, comprising:
a body unit;
a notification unit provided in the body unit; and
a notification control unit that controls an operation of the notification unit, to thereby notify of information regarding at least one of an orientation of the body unit or a position on the body unit as assistance information for assisting work of a user on the movable object.

2. The movable object according to claim 1, wherein the notification control unit controls an operation of the notification unit, to thereby notify of information regarding progress of the work of the user on the movable object as the assistance information.

3. The movable object according to claim 2, wherein the notification control unit notifies of at least one of information indicating that the work of the user on the movable object has been completed or information indicating that the work of the user on the movable object has failed as the assistance information.

4. The movable object according to claim 2, wherein in a case where the work of the user on the movable object includes a plurality of steps, the notification control unit notifies of at least one of information indicating that the step has been completed or information indicating that the step has failed with respect to each of the plurality of steps as the assistance information.

5. The movable object according to claim 1, further comprising
a sensor unit, wherein
the assistance information includes information for assisting calibration work on the sensor unit.

6. The movable object according to claim 5, wherein the sensor unit includes at least one of an inertial sensor, a geomagnetic sensor, or an image sensor.

7. The movable object according to claim 1, further comprising
a predetermined functional component provided in the body unit, wherein
the notification control unit notifies of information indicating a direction of moving the functional component as the assistance information for assisting work of moving the functional component.

8. The movable object according to claim 1, wherein the body unit has a front surface portion, a left side surface portion, a rear surface portion, and a right side surface portion,
the notification unit has a front surface portion-side light source provided in the front surface portion, a left side surface portion-side light source provided in the left side surface portion, a rear surface portion-side light source provided in the rear surface portion, and a right side surface portion-side light source provided in the right side surface portion, and
the notification control unit controls light-up of each of the front surface portion-side light source, the left side surface portion-side light source, the rear surface portion-side light source, and the right side surface portion-side light source, to thereby notify of a portion that is on a side opposite to ground out of the front surface portion, the left side surface portion, the rear surface portion, and the right side surface portion with respect to work of placing the body unit on the ground.

9. The movable object according to claim 8, wherein the body unit has an upper surface portion and a lower surface portion,
the notification unit has an upper surface portion-side light source provided in the upper surface portion and a lower surface portion-side light source provided in the lower surface portion, and
the notification control unit controls light-up of each of the upper surface portion-side light source and the lower surface portion-side light source, to thereby notify of a portion that is on a side opposite to ground out of the upper surface portion and the lower surface portion with respect to work of placing the body unit on the ground.

10. The movable object according to claim 9, wherein the front surface portion-side light source has a first light source provided at a boundary between the front surface portion and the left side surface portion and a second light source provided at a boundary between the front surface portion and the right side surface portion,
the left side surface portion-side light source has the first light source and a third light source provided at a boundary between the left side surface portion and the rear surface portion, the rear surface portion-side light source has the third light source and a fourth light source provided at a boundary between the rear surface portion and the right side surface portion, the right side surface portion-side light source has the second light source and the fourth light source, and the notification control unit controls light-up of each of the first light source, the second light source, the third light source, and the fourth light source, to thereby notify of a portion that is on a side opposite to ground out of the front surface portion, the left side surface portion, the rear surface portion, and the right side surface portion with respect to work of placing the body unit on the ground.

11. The movable object according to claim 10, wherein each of the first light source, the second light source, the third light source, and the fourth light source is provided at a position included in the upper surface portion and functions as the upper surface portion-side light source, and the notification control unit controls light-up of each of the first light source, the second light source, the third light source, and the fourth light source, to thereby notify of a portion that is on a side opposite to ground out of the upper surface portion and the lower surface portion with respect to work of placing the body unit on the ground.

12. The movable object according to claim 1, wherein the body unit has a front surface portion, a left side surface portion, a rear surface portion, and a right side surface portion, the notification unit has a front surface portion-side light source provided in the front surface portion, a left side surface portion-side light source provided in the left side surface portion, a rear surface portion-side light source provided in the rear surface portion, and a right side surface portion-side light source provided in the right side surface portion, and the notification control unit controls light-up of each of the front surface portion-side light source, the left side surface portion-side light source, the rear surface portion-side light source, and the right side surface portion-side light source, to thereby notify an orientation of the body unit retained by the user with respect to work of retaining the body unit and performing a predetermined motion.

13. The movable object according to claim 12, wherein the notification control unit controls light-up of each of the front surface portion-side light source, the left side surface portion-side light source, the rear surface portion-side light source, and the right side surface portion-side light source, to thereby notify of a portion that is on a side oriented toward the user out of the front surface portion, the left side surface portion, the rear surface portion, and the right side surface portion or notify of a portion that is on a side opposite to ground out of the front surface portion, the left side surface portion, the rear surface portion, and the right side surface portion.

14. The movable object according to claim 1, further comprising a plurality of propellers, wherein the body unit includes a plurality of retaining units that retains the plurality of propellers, the notification unit includes a light source provided in each of the plurality of retaining units, and the notification control unit controls light-up of the light source provided in each of the plurality of retaining units, to thereby notify of a position of the propeller that is a replacement work target.

15. The movable object according to claim 1, wherein the notification unit includes at least one of a light source device, a sound output device, or a display device, and the notification control unit controls at least one of light-up of the light source device, sound output of the sound output device, or image display of the display device, to thereby notify of the assistance information.

16. The movable object according to claim 15, wherein the light source device includes a plurality of light-emitting diodes, and the notification control unit controls a light-up pattern of the plurality of light-emitting diodes, to thereby notify of the assistance information.

17. The movable object according to claim 15, further comprising:

a propeller provided in the body unit; and a motor that rotates the propeller, wherein the motor functions as the sound output device by rotating and outputting a sound in a state in which the propeller is detached.

18. The movable object according to claim 1 that is configured as a drone.

19. A notification method, comprising controlling an operation of a notification unit provided in a body unit of a movable object, to thereby notify of information regarding at least one of an orientation of the body unit or a position on the body unit as assistance information for assisting work of a user on the movable object.

20. A notification system, comprising:

a reception unit that receives from a user an instruction to perform work of the user on a movable object; and a notification control unit that controls, in a case where the instruction to perform the work of the user on the movable object has been received, an operation of a notification unit provided in the body unit of the movable object, to thereby notify of information regarding at least one of an orientation of the body unit or a position on the body unit as assistance information for assisting work of a user on the movable object.

* * * * *